(12) United States Patent
Steinert et al.

(10) Patent No.: US 9,748,797 B2
(45) Date of Patent: Aug. 29, 2017

(54) KEY INTERLOCK SYSTEM AND METHOD FOR SAFE OPERATION OF ELECTRIC POWER DISTRIBUTION SYSTEM

(71) Applicant: Microsoft Technology Licensing, LLC., Redmond, WA (US)

(72) Inventors: Steven R. Steinert, Monroe, WA (US); Daniel N. McManus, Lynnwood, WA (US); Joseph L. Soroka, Cumming, GA (US); Vincent Karczewski, Carnation, WA (US); Shu-Kuen Raymond Chiu, Redmond, WA (US); Kris S. Redding, Bothell, WA (US); Scott T. Seaton, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 14/590,766

(22) Filed: Jan. 6, 2015

(65) Prior Publication Data

US 2016/0197483 A1    Jul. 7, 2016

(51) Int. Cl.
*H02J 4/00* (2006.01)
*H02J 9/04* (2006.01)
*H02J 3/00* (2006.01)

(52) U.S. Cl.
CPC ............. *H02J 9/04* (2013.01); *H02J 3/006* (2013.01)

(58) Field of Classification Search
CPC ....... H02J 4/00; H02J 9/04; H02J 7/00; H02B 1/32
See application file for complete search history.

(56) References Cited

U.S. PATENT DOCUMENTS

| | | | | | |
|---|---|---|---|---|---|
| 2,544,305 | A | * | 3/1951 | Finke | E05B 35/12 70/265 |
| 3,327,169 | A | * | 6/1967 | Comstock, Jr. | H01H 33/52 307/328 |
| 3,644,870 | A | * | 2/1972 | Jones | H02B 1/24 439/152 |

(Continued)

OTHER PUBLICATIONS

"International Search Report and Written Opinion Issued in PCT Application No. PCT/US2016/012099", Mailed Date: Jul. 6, 2016, 12 Pages.

(Continued)

*Primary Examiner* — Jared Fureman
*Assistant Examiner* — Win Htun
(74) *Attorney, Agent, or Firm* — Fiala & Weaver P.L.L.C.

(57) ABSTRACT

Key interlock systems and methods are described for safely carrying out a closed-transition procedure in an electric power distribution system in which two load busses that can be separately powered by the same power source or by two different power sources can be connected together via one or more bus tie breakers and in which a static transfer switch is used to selectively deliver power from one of the two different power sources to at least one of the load busses. Embodiments described herein prohibit access to a key that is required to close a bus tie breaker that connects the two load busses until at least a determination is made that a particular bypass breaker of the static transfer switch has been closed, thereby ensuring that both load busses are connected to the same power source.

20 Claims, 12 Drawing Sheets

(56) References Cited

U.S. PATENT DOCUMENTS

| | | | | |
|---|---|---|---|---|
| 4,489,362 | A | * | 12/1984 | Castonguay ............ H02B 11/26 200/50.24 |
| 5,081,367 | A | * | 1/1992 | Smith ..................... H02J 9/062 307/64 |
| 5,581,133 | A | * | 12/1996 | Smith ....................... H02J 9/00 200/50.09 |
| 6,191,500 | B1 | * | 2/2001 | Toy ........................... H02J 3/46 307/64 |
| 8,546,689 | B2 | | 10/2013 | Andersen et al. |
| 8,670,872 | B2 | * | 3/2014 | Rasmussen ............... H02J 9/06 307/70 |
| 2011/0215645 | A1 | | 9/2011 | Schomburg et al. |
| 2012/0218684 | A1 | * | 8/2012 | Andersen ................. H02B 1/20 361/601 |
| 2013/0063871 | A1 | * | 3/2013 | Weiher ..................... H02H 3/08 361/643 |
| 2013/0293017 | A1 | * | 11/2013 | Englert ...................... H02J 9/04 307/65 |
| 2014/0029168 | A1 | * | 1/2014 | Andersen ................. H02B 1/20 361/624 |
| 2014/0054966 | A1 | * | 2/2014 | Jain ........................... H02J 9/00 307/65 |
| 2015/0035358 | A1 | * | 2/2015 | Linkhart ................. H02J 3/006 307/23 |

OTHER PUBLICATIONS

"Instructions for Cutler-Hammer Closed Transition Soft Load Drawout Transfer Switch", Retrieved on: Oct. 21, 2014, Available at: https://www.google.co.in/url?sa=t&rct=j&q=&esrc=s&source=web&cd=2&cad=rja&uact=8&ved=0CCIQFjAB&url=http%3A%2F%2Fwww.eaton.in%2Fecm%2Fidcplg%3FIdcService%3DGET_FILE%26allowInterrupt%3D1%26RevisionSelectionMethod%3DLatestReleased%26Rendition%3DPrimary%26dDocName%.

Edvard, "Automatic transfer switch (ATS) between two low-voltage utility supplies", In Proceedings of Technical Articles, Jan. 15, 2014, 5 pages.

"What are the procedures to synchronize generators in parallel?", In Proceeding of Electrical Engineering, Electrical Wiring, Technology, Published on: Sep. 13, 2013, Available at: http://www.answers.com/Q/What_are_the_procedures_to_synchronize_generators_in_parallel, 5 pages.

Medich, Benjamin O., "Sizing equipment for closed-transition transfer operation", Published on: Sep. 27, 2012, Available at: http://www.csemag.com/single-article/sizing-equipment-for-closed-transition-transfer-operation/bcab7b43d99a9fa3b6498fd9a9384181.html, 3 pages.

"Be Prepared-Switch power sources quickly and efficiently with Automatic Throwovers.", Retrieved on: Oct. 21, 2014, Available at: http://apps.geindustrial.com/publibrary/checkout/GEA-10261B?TNR=Brochures|GEA-10261B|generic, 4 pages.

"Guide Specification for Closed Transition Automatic Transfer Switches", Retrieved on: Oct. 21, 2014, Available at: http://downloads.eatoncanada.ca/downloads/Automatic%20Transfer%20Switches/Specifications/Closed%20Transition%20Automatic%20Transfer%20Switches.pdf, 9 pages.

Gary Olson, "Guidelines for ATS selection: How to choose the right transfer solution for your power application", In White Paper of Cummins Power Generation Inc., Jan. 4, 2010, 6 pages.

"International Preliminary Report on Patentability Issued in PCT Application No. PCT/US2016/012099", Mailed Date: Jan. 11, 2017, 7 Pages.

* cited by examiner

KEY INTERLOCK SYSTEM AND METHOD FOR SAFE OPERATION OF ELECTRIC POWER DISTRIBUTION SYSTEM

BACKGROUND

In some electric power distribution systems, a main-tie-tie-main configuration is used. In accordance with a main-tie-tie-main configuration, a first load bus powered via a first main breaker and a second load bus powered via a second main breaker can be connected together by closing two bus tie breakers that are connected between the two load busses. The first load bus can be powered by the same power source as the second load bus or by a different power source. For example, the first load bus may be connected to a static transfer switch that can selectively deliver power to the first load bus from a first power source or a second power source while the second load bus may simply be powered by the first power source.

In such an arrangement, it may be deemed necessary or desirable to take the static transfer switch offline (e.g., for maintenance) while still providing power to the first load bus. To achieve this, the first load bus may be disconnected from the static transfer switch and connected to the second load bus by closing the bus tie breakers, after which the first load bus is powered via its connection to the second load bus. To ensure continuity of power to the loads connected to the first load bus, a closed-transition or make-before-break transfer procedure may be used to perform this operation. In accordance with such a procedure, the static transfer switch remains connected and supplies power to the first load bus until the second load bus is also connected to the first load bus via the closing of one or more of the bus tie breakers. After this, the static transfer switch is disconnected from the first load bus. To carry out the closed-transition procedure safely, it is critical to ensure that the first load bus and the second load bus are both being powered by the same power source before the bus tie breakers are closed.

SUMMARY

Key interlock systems and methods are described herein for safely carrying out a closed-transition or make-before-break procedure in an electric power distribution system that has a main-tie-tie-main or similar architecture and that utilizes at least one static transfer switch.

For example, the key interlock systems and methods described herein may be used to safely carry out a closed-transition procedure in an electric power distribution system in which two separately powered load busses that can be separately powered by the same power source or by two different power sources can be connected together via one or more bus tie breakers and in which a static transfer switch is used to selectively deliver power from one of the two different power sources to at least one of the load busses. Embodiments described herein prohibit access to a key that is required to close a bus tie breaker that connects the two load busses until at least a determination is made that a particular bypass breaker of the static transfer switch has been closed, thereby ensuring that both load busses are connected to the same power source. In embodiments, a solenoid key release unit that is integrated with the static transfer switch is energized when at least the bypass breaker is closed, thereby causing a key to be released from the solenoid key release unit that can then be used to obtain the key needed to close the bus tie breaker.

In accordance with further embodiments, switching logic of the static transfer switch is disabled when the key is removed from the solenoid key release unit, thereby providing a further safeguard against the inadvertent connection of two out of phase power sources together during the closed-transition procedure.

In accordance with still further embodiments, a key transfer block will only release the key required to close the bus tie breaker when it has at least captured the key removed from the solenoid key release unit and another key obtained from a key interlock device that has been manipulated by an operator to permit closing of the bypass breaker. By capturing the key obtained from the key interlock device, the key transfer block can prevent an operator from using that key to cause the static transfer switch to deliver power to the first load bus from a different power source than that being used to power the second load bus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
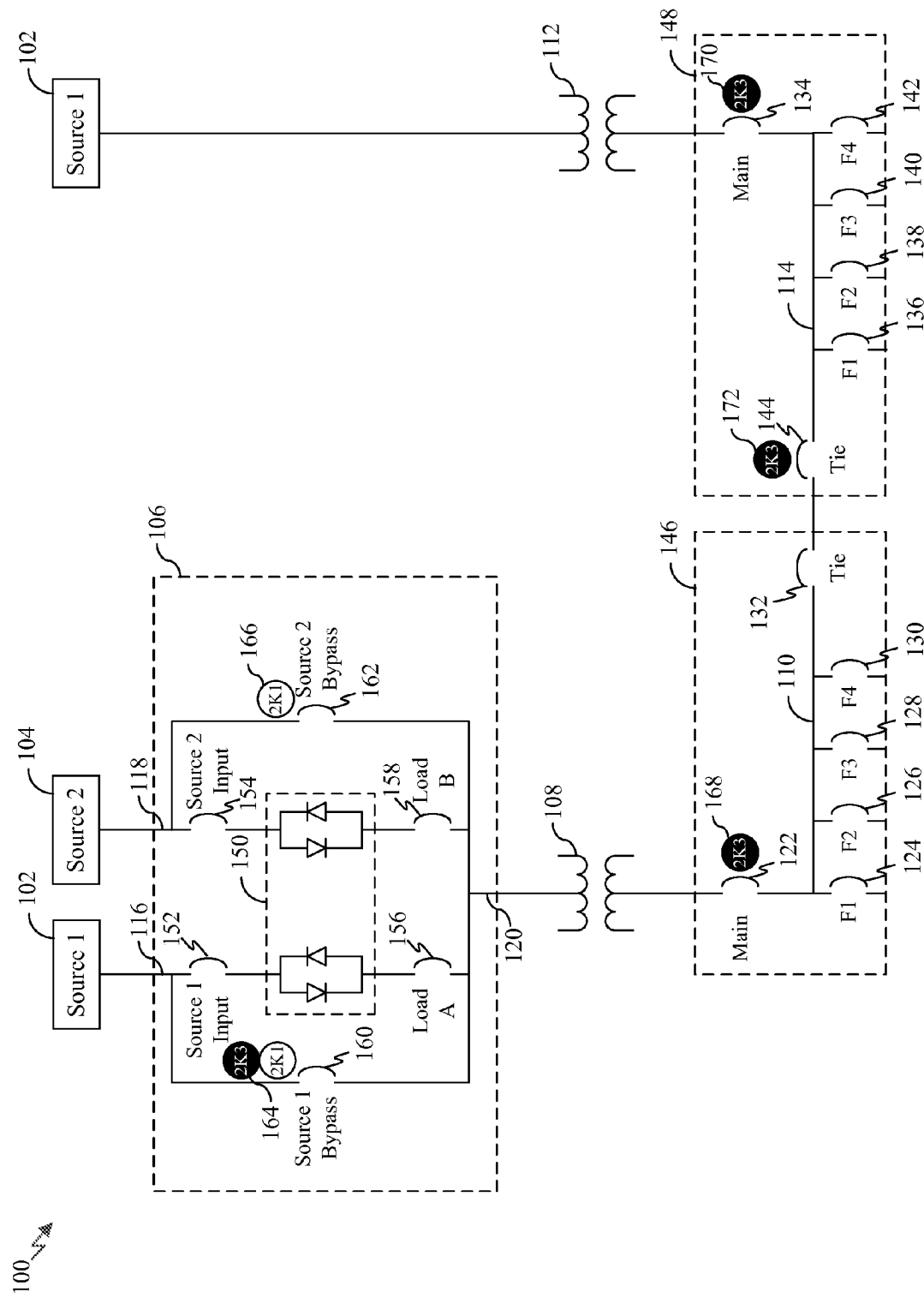
FIG. 1 is a block diagram of an electric power distribution system having a main-tie-tie-main configuration and a single static transfer switch, the electric power distribution system implementing a key interlock system to ensure safe performance of a closed-transition procedure.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Key interlock systems and methods are described herein for safely carrying out a closed-transition or make-beforebreak procedure in an electric power distribution system that has a main-tie-tie-main or similar architecture and that utilizes at least one static transfer switch. To help illustrate the inventive key interlock systems and methods, Section II describes a first key interlock system and method and shortcomings thereof. Then, Section III describes various improved key interlock systems and methods. Section IV describes some additional exemplary embodiments. Finally, Section V provides some concluding remarks.

II. Exemplary First Key Interlock System and Method

FIG. 1 is a block diagram of an electric power distribution system 100 that has a main-tie-tie-main configuration and a single static transfer switch. As will be described in this section, electric power distribution system 100 implements a key interlock scheme that is intended to ensure safe performance of a closed-transition procedure.

As shown in FIG. 1, electric power distribution system 100 includes a first power source 102 (also denoted "Source 1") and a second power source 104 (also denoted "Source 2"). In one embodiment, first power source 102 comprises a primary uninterruptible power supply (UPS) and second power source 104 comprises an alternate UPS. However, this example is not intended to be limiting, and each of first power source 102 and second power source 104 may comprise other types of power sources including but not limited to utility power grids, generators (e.g., diesel or gas turbine generators), or battery banks. In an embodiment, first power source 102 and second power source 104 comprise AC power sources.

Electric power distribution system 100 also includes a static transfer switch 106 having a first power connection 116, a second power connection 118 and a third power connection 120. First power source 102 is connected to static transfer switch 106 via first power connection 116. Second power source 104 is connected to static transfer switch 106 via second power connection 118. Generally speaking, static transfer switch 106 can operate to distribute electric power supplied by either first power source 102 or second power source 104 to a first load bus 110 to which static transfer switch 106 is connected via third power connection 120. More details concerning the manner of operation of static transfer switch 106 will be provided below.

A first transformer 108 is connected between third power connection 120 of static transfer switch 106 and first load bus 110. First transformer 108 operates in a well-known manner to modify (e.g., step down) a voltage level of electricity supplied by static transfer switch 106 to a level that is suitable for loads that may be connected to first load bus 110.

A main breaker 122 is connected between first transformer 108 and first load bus 110. When closed, main breaker 122 enables electric power to be supplied from static transfer switch 106 to first load bus 110. When open, main breaker 122 electrically isolates first load bus 110 from static transfer switch 106.

A plurality of loads may be connected to first load bus 110 via a corresponding plurality of distribution breakers 124, 126, 128 and 130. When closed, each of distribution breakers 124, 126, 128 and 130 enables power to be supplied from first load bus 110 to a respective load attached thereto. When open, each of distribution breakers 124, 126, 128 and 130 electrically isolates a respective load attached thereto from first load bus 110.

As further shown in FIG. 1, first power source 102 is also connected to a second load bus 114 via a separate power distribution path. In particular, a second transformer 112 is connected between first power supply 102 and second load bus 114. Second transformer 112 operates in a well-known manner to modify (e.g., step down) a voltage level of electricity supplied by first power source 102 to a level that is suitable for loads that may be connected to second load bus 114.

A main breaker 134 is connected between second transformer 112 and second load bus 114. When closed, main breaker 134 enables power to be supplied from first power source 102 to second load bus 114. When open, main breaker 134 electrically isolates second load bus 114 from first power source 102.

A plurality of loads may be connected to second load bus 114 via a corresponding plurality of distribution breakers 136, 138, 140 and 142. When closed, each of distribution breakers 136, 138, 140 and 142 enables power to be supplied from second load bus 114 to a respective load attached thereto. When open, each of distribution breakers 136, 138, 140 and 142 electrically isolates a respective load attached thereto from second load bus 114.

A first bus tie breaker 132 and a second bus tie breaker 144 are connected in series between first load bus 110 and a second load bus 114. When first bus tie breaker 132 and second bus tie breaker 144 are both closed, first load bus 110 and second load bus 114 effectively become a single load bus to which power may be supplied via main breaker 122, main breaker 134, or both main breaker 122 and main breaker 134. When either of first bus tie breaker 132 or second bus tie breaker 144 is open, first load bus 110 and second load bus 114 are electrically isolated from each other.

In electric power distribution system 100, operator access to main breaker 122, first bus tie breaker 132, and distribution breakers 124, 126, 128 and 130 is provided via a first switchboard 146. For example, an operator may interact with various switches on switchboard 146 to selectively open or close each of these breakers. Similarly, operator access to each of main breaker 134, second bus tie breaker 144, and distribution breakers 136, 138, 140 and 142 is provided via a second switchboard 148. For example, an operator may interact with various switches on switchboard 148 to selectively open or close each of these breakers.

As further shown in FIG. 1, static transfer switch 106 includes switching logic 150. First power source 102 is connected to switching logic 150 via first power connection 116 and second power source 104 is connected to switching logic 150 via second power connection 118. Switching logic 150 includes a plurality of silicon-controlled rectifiers (SCRs), the gates of which can be automatically controlled by control logic within switching logic 150 (not shown in FIG. 1) to selectively cause power from first power source 102 or from second power source 104 to be supplied to first load bus 110 via third power connection 120. For example, in one operational scenario, switching logic 150 may automatically switch from supplying power to first load bus 110 from first power source 102 to supplying power to first load bus 110 from second power source 104 in response to sensing that first power source 102 is not supplying power in accordance with certain operating parameters or requirements.

Static transfer switch 106 includes a number of circuit breakers. In particular, static transfer switch 106 includes a first source input breaker 152, a second source input breaker 154, a first load breaker 156, a second load breaker 158, a first bypass breaker 160 and a second bypass breaker 162. An operator may open or close each of the circuit breakers to manually modify the manner of operation of static transfer switch 106. In a state of operation in which switching logic 150 is enabled and intended to control the supply of power to first load bus 110, first source input breaker 152, second source input breaker 154, first load breaker 156 and second load breaker 158 are closed and first bypass breaker 160 and second bypass breaker 162 are open.

Electric power distribution system 100 (and the other electric power distribution systems described herein) may be used in a data center to provide continuous and reliable power to a plurality of servers, such as a plurality of dual-corded servers. For example, each dual-corded server in the plurality of dual-corded servers may be connected via a first power cord to first load bus 110 and also connected via a second power cord to second load bus 114. However, the electric power distribution systems described herein are not limited to data center operating environments and may advantageously be used to supply power to loads in other operating environments as well, and particularly those in which it is important to supply power to loads in a continuous and reliable manner (e.g., hospitals).

To enable maintenance to be performed on static transfer switch 106 (or for other reasons as well), it may be desired to take static transfer switch 106 offline while still providing power to first load bus 110. To achieve this, first load bus 110 may be disconnected from static transfer switch 106 by opening main breaker 122 and by closing first bus tie breaker 132 and second bus tie breaker 144 (or closing one of those bus tie breakers if the other was already closed), after which first load bus 110 is powered via its connection to second load bus 114. To ensure continuity of power to the loads connected to first load bus 110, a closed-transition or make-before-break transfer procedure may be used to perform this operation. In accordance with such a procedure, static transfer switch 106 remains connected and supplies power to first load bus 110 until second load bus 114 is also connected to first load bus 110 via the closing of one or both of first bus tie breaker 132 and second bus tie breaker 144. After this, static transfer switch 106 is disconnected from first load bus 110.

To carry out the closed-transition procedure safely, it is desirable to ensure that first load bus 110 and second load bus 114 are both being powered by the same power source (in this case, first power source 102) before first bus tie breaker 132 and second bus tie breaker 144 are closed. If first load bus 110 and second load bus 114 are being powered by different out-of-phase power sources when first bus tie breaker 132 and second bus tie breaker 144 are closed, then a fault condition may occur that can result in damage to and/or failure of equipment within electric power distribution system 100 and also create a significant safety hazard for people located closely thereto.

To avoid this, electric power distribution system 100 employs a key interlock system and method that is intended to prohibit access to a key that is necessary to close second bus tie breaker 144 until certain operating conditions have been met. The key interlock system and method utilized by electric power distribution system 100 is intended to require an operator to carry out a closed-transition procedure in a manner that avoids the closing of two out-of-phase power sources. However, as will be described below, this key interlock system and method has certain shortcomings.

In accordance with the key interlock system and method of electric power distribution system 100, a first key interlock device 164 is mounted proximate to first bypass breaker 160, a second key interlock device 166 is mounted proximate to second bypass breaker 162, a third key interlock device 168 is mounted proximate to main breaker 122, a fourth key interlock device 170 is mounted proximate to main breaker 134, and a fifth key interlock device 172 is mounted proximate to second bus tie breaker 144. The key interlock system and method further includes a first key (denoted "2K1" in FIG. 1) and first, second and third copies of a second key (denoted "2K3").

First key interlock device 164 is operable to be transitioned from a first state to a second state using the first key (2K1). The first state of first key interlock device 164 comprises a state in which first key interlock device 164 impedes closing of first bypass breaker 160, allows insertion and removal of the first key (2K1), and prevents removal of a copy of the second key (2K3). The second state of first key interlock device 164 comprises a state in which first key interlock device 164 does not impede the closing of first bypass breaker 160, enables insertion and removal of the copy of the second key (2K3), and prevents removal of the first key (2K1).

Figure 2:
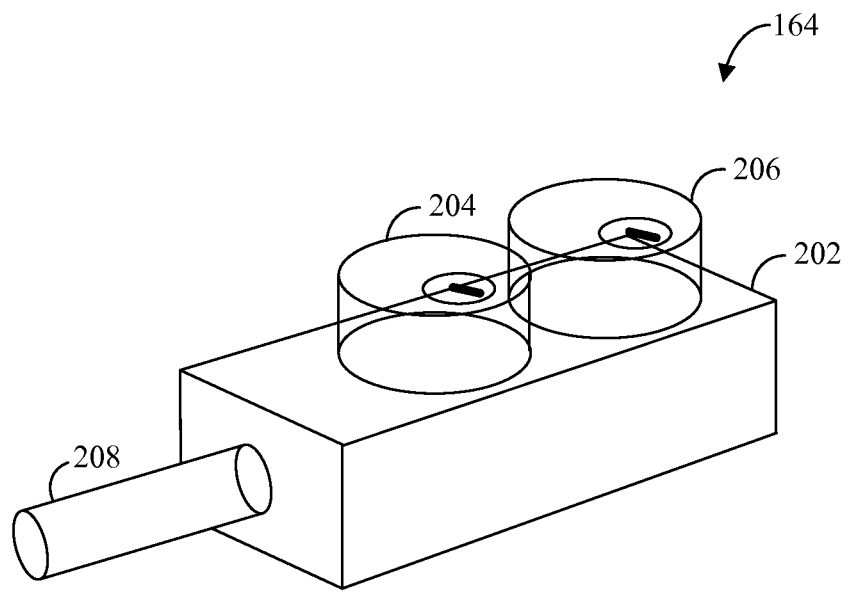
FIG. 2 depicts a perspective view of a key interlock device having a housing, two key lock cylinders and a sliding lock bolt.

For example, first key interlock device 164 may be implemented in a manner shown in FIG. 2. As illustrated in that figure, first key interlock device 164 may comprise a housing 202, a first lock cylinder 204, a second lock cylinder 206, and a sliding lock bolt 208. First lock cylinder 204 is configured to receive the first key (2K1) and is rotatable thereby to transition first key interlock device 164 from the first state to the second state. In particular, the rotation of first lock cylinder 204 using the first key (2K1) causes sliding lock bolt 208 to retract into housing 202 such that it does not physically impede the closing of first bypass breaker 160. The rotation of first lock cylinder 204 using the first key (2K1) also causes second lock cylinder 206 to release the copy of the second key (2K3). Once first key interlock device 164 has been transitioned to the second state, the first key (2K1) may be captured in first lock cylinder 204 such that it cannot be removed from first key interlock device 164.

Second lock cylinder 206 is configured to receive the copy of the second key (2K3) and is rotatable thereby to transition first key interlock device 164 from the second state to the first state. In particular, the rotation of second lock cylinder 206 using the copy of the second key (2K3) causes sliding lock bolt 208 to extend out of housing 202 such that it physically impedes the closing of first bypass breaker 160. The rotation of second lock cylinder 206 using the second key (2K3) also causes first lock cylinder 204 to release the first key (2K1). Once first key interlock device 164 has been transitioned to the first state, the copy of the second key (2K3) may be captured in second lock cylinder 206 such that it cannot be removed from first key interlock device 164.

Second key interlock device 166 is operable to be transitioned from a first state to a second state using the first key (2K1). The first state of second key interlock device 166 comprises a state in which second key interlock device 166 impedes closing of second bypass breaker 162 and allows insertion and removal of the first key (2K1). The second state of second key interlock device 166 comprises a state in which second key interlock device 166 does not impede the closing of second bypass breaker 162 and prevents removal of the first key (2K1) from second key interlock device 166.

Figure 3:
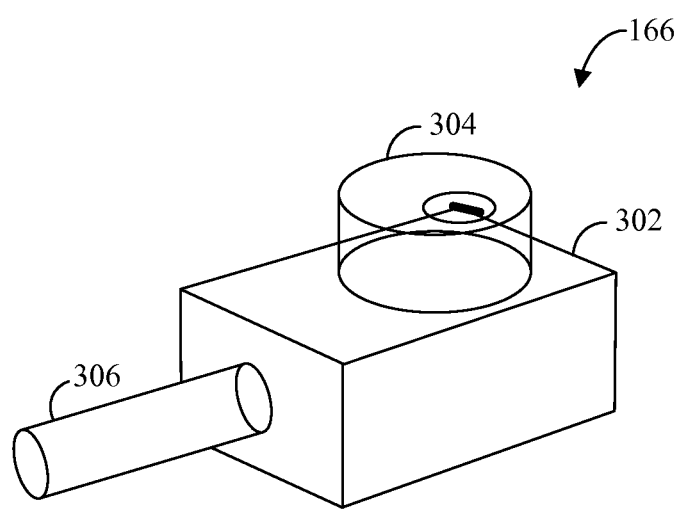
FIG. 3 depicts a perspective view of a key interlock device having a housing, a key lock cylinder and a sliding lock bolt.

For example, second key interlock device 166 may be implemented in a manner shown in FIG. 3. As illustrated in that figure, second key interlock device 166 may comprise a housing 302, a lock cylinder 304, and a sliding lock bolt 306. Lock cylinder 304 is configured to receive the first key (2K1) and is rotatable thereby in a first direction to transition second key interlock device 166 from the first state to the second state. In particular, the rotation of lock cylinder 304 using the first key (2K1) in a first direction causes sliding lock bolt 306 to retract into housing 302 such that it does not physically impede the closing of second bypass breaker 162. Once second key interlock device 166 has been transitioned to the second state, the first key (2K1) may be captured in lock cylinder 304 such that it cannot be removed from second key interlock device 166. Lock cylinder 304 is also rotatable by the first key (2K1) in a second direction to transition second key interlock device 166 from the second state to the first state. In particular, the rotation of lock cylinder 304 using the first key (2K1) in a second direction causes sliding lock bolt 306 to slide or extend out of housing 302 such that it physically impedes the closing of second bypass breaker 162. The rotation of lock cylinder 304 in the second direction using the first key (2K1) also causes lock cylinder 304 to release the first key (2K1).

Third key interlock device 168 is operable to be transitioned from a first state to a second state using a copy of the second key (2K3). The first state of third key interlock device 168 comprises a state in which third key interlock device 168 impedes closing of main breaker 122 and allows insertion and removal of the copy of the second key (2K3). The second state of third key interlock device 168 comprises a state in which third key interlock device 168 does not impede the closing of main breaker 122 and prevents removal of the copy of the second key (2K3) from third key interlock device 168. Third key interlock device 168 may be of a same or similar design as second key interlock device 166 as described above in reference to FIG. 3.

Fourth key interlock device 170 is operable to be transitioned from a first state to a second state using a copy of the second key (2K3). The first state of fourth key interlock device 170 comprises a state in which fourth key interlock device 170 impedes closing of main breaker 134 and allows insertion and removal of the copy of the second key (2K3). The second state of fourth key interlock device 170 comprises a state in which fourth key interlock device 170 does not impede the closing of main breaker 134 and prevents removal of the copy of the second key (2K3) from fourth key interlock device 170. Fourth key interlock device 170 may be of a same or similar design as second key interlock device 166 as described above in reference to FIG. 3.

Fifth key interlock device 172 is operable to be transitioned from a first state to a second state using a copy of the second key (2K3). The first state of fifth key interlock device 172 comprises a state in which fifth key interlock device 172 impedes closing of second bus tie breaker 144 and allows insertion and removal of the copy of the second key (2K3). The second state of fifth key interlock device 172 comprises a state in which fifth key interlock device 172 does not impede the closing of second bus tie breaker 144 and prevents removal of the copy of the second key (2K3) from fifth key interlock device 172. Fifth key interlock device 172 may be of a same or similar design as second key interlock device 166 as described above in reference to FIG. 3.

A closed-transition procedure in accordance with the key interlock system and method implemented by electric power distribution system 100 will now be described. For the purpose of this explanation, it will be assumed that the following operational state exists before an operator initiates the closed-transition procedure:

With respect to static transfer switch 106: first source input breaker 152, second source input breaker 154, first load breaker 156, and second load breaker 158 are closed, while first bypass breaker 160 and second bypass breaker 162 are open;

First key interlock device 164 is in its first state (impeding the closing of first bypass breaker 160, allowing insertion and removal of the first key (2K1), and preventing removal of a copy of the second key (2K3));

Second key interlock device 166 is in its first state (impeding the closing of second bypass breaker 162 and allowing insertion and removal of the first key (2K1));

With respect to first switchboard 146: main breaker 122, first bus tie breaker 132, and distribution breakers 124, 126, 128 and 130 are all closed;

Third key interlock device 168 is in its second state (not impeding the closing of main breaker 122 and preventing removal of a copy of the second key (2K3))

With respect to second switchboard 148: main breaker 134 and distribution breakers 136, 138, 140 and 142 are closed, while second bus tie breaker 144 is open;

Fourth key interlock device 170 is in its second state (not impeding the closing of main breaker 134 and preventing removal of a copy of the second key (2K3)); and Fifth key interlock device 172 is in its first state (impeding the closing of second bus tie breaker 144 and allowing insertion and removal of a copy of the second key (2K3)).

Thus, in accordance with this initial operating state, static transfer switch 106 is selectively supplying power to first load bus 110 from one of first power source 102 or second power source 104, first power source 102 is supplying power to second load bus 114, and first load bus 110 and second load bus 114 are not electrically connected because second bus tie breaker 144 is open.

Furthermore, in accordance with this initial operating state, the first key (2K1) is available for use by the operator, while all three copies of the second key (2K3) are captured—one by first key interlock device 164, one by third key interlock device 168, and one by fourth key interlock device 170. Thus, the operator cannot currently close second bus tie breaker 144 since there are no copies of the second key (2K3) available to change the state of fifth key interlock device 172 such that it is not impeding the closing of that breaker.

To perform the closed-transition procedure, the operator first opens second source input breaker 154.

Then, the operator uses the first key (2K1) to transition first key interlock device 164 from its first state to its second state. At this point, first key interlock device 164 no longer impedes the closing of first bypass breaker 164 and also allows removal of a copy of the second key (2K3).

The operator then closes first bypass breaker 160. This, along with the opening of second source input breaker 154, ensures that power is being supplied to first load bus 110 by first power source 102, which is the same power source that is supplying power to second load bus 114.

The operator then takes the copy of the second key (2K3) that was released from first key interlock device 164 and uses it to transition fifth key interlock device 172 from its first state to its second state. At this point, fifth key interlock device 172 is not impeding the closing of second bus tie breaker 144.

The operator then closes second bus tie breaker 144, thereby electrically connecting first load bus 110 to second load bus 114 while they are both being powered by the same power source. After this point, static transfer switch 106 can be disconnected from first load bus 110 (e.g., by transitioning third key interlock device 168 from its second state to its first state and then opening main breaker 122) without any discontinuity of power to the loads connected to first load bus 110.

A significant safety issue exists in the foregoing key interlock system and method—namely, there is nothing that requires the operator to open second source input breaker 154 or close first bypass breaker 160 before closing second bus tie breaker 144. The operator is only required to enable first bypass breaker 160 to be closed. Consequently, the operator can potentially close second bus tie breaker 144 while second source input breaker 154 is closed, first bypass breaker 160 is open, and static transfer switch 106 is supplying power to first load bus 110 from second power source 104. As mentioned above, if second power source 104 is out of phase with first power source 102, then closing second bus tie breaker 144 at such a time could result in damage to and/or failure of equipment within electric power distribution system 100 and also create a safety hazard for people located closely thereto. Various key interlock systems and methods that address this safety issue will be described in the following section.

III. Exemplary Improved Key Interlock Systems and Methods

Figure 4:
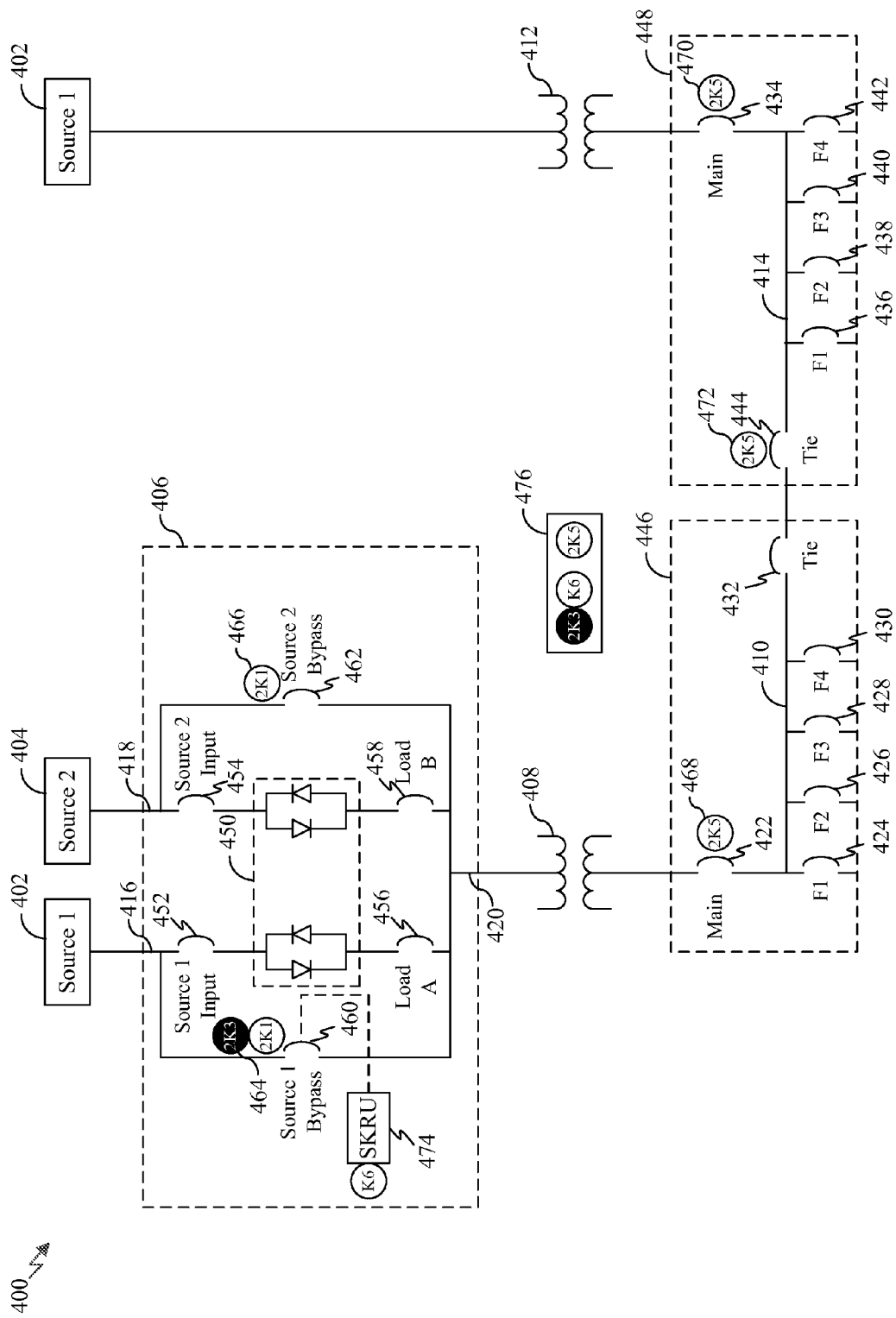
FIG. 4 is a block diagram of an electric power distribution system having a main-tie-tie-main configuration and a single static transfer switch, the electric power distribution system implementing an improved key interlock system to ensure safe performance of a closed-transition procedure in accordance with an embodiment.

FIG. 4 is a block diagram of an electric power distribution system 400 that has a main-tie-tie-main configuration and a single static transfer switch. As will be described in this section, electric power distribution system 400 implements an improved key interlock scheme that is intended to ensure safe performance of a closed-transition procedure in a manner that addresses certain safety issues present in the key interlock scheme discussed in the preceding section.

Electric power distribution system 400 has a substantially similar architecture to electric power distribution system 100 as discussed above in reference to FIG. 1. Thus, for the sake of brevity, it suffices to state that electric power distribution system 400 includes a first power source 402, a second power source 404, a first transformer 408, a first load bus 410, a second load bus 414, and a second transformer 412 that may be structurally, functionally and/or operationally equivalent to first power source 102, second power source 104, first transformer 108, first load bus 110, second load bus 114, and second transformer 112, respectively, of electric power distribution system 100.

Furthermore, static transfer switch 406 includes a first power connection 416, a second power connection 418, a third power connection 420, switching logic 450, a first source input breaker 452, a second source input breaker 454, a first load breaker 456, a second load breaker 458, a first bypass breaker 460 and a second bypass breaker 462 that may be structurally, functionally and/or operationally equivalent to first power connection 116, second power connection 118, third power connection 120, switching logic 150, first source input breaker 152, second source input breaker 154, first load breaker 156, second load breaker 158, first bypass breaker 160 and second bypass breaker 162, respectively, of static transfer switch 106.

Still further, electric power distribution system 400 includes a first switchboard 446, a main breaker 422, distribution breakers 424, 426, 428, 430, a first bus tie breaker 432, a second switchboard 448, a second main breaker 434, distribution breakers 436, 438, 440, 442, and a second bus tie breaker 444 that may be structurally, functionally and/or operationally equivalent to first switchboard 146, main breaker 122, distribution breakers 124, 126, 128, 130, first bus tie breaker 132, second switchboard 148, second main breaker 134, distribution breakers 136, 138, 140, 142 and second bus tie breaker 144, respectively, of electric power distribution system 100.

For reasons previously discussed, it may be desired to perform a closed-transition procedure in a manner that ensures that first load bus 410 and second load bus 414 are both being powered by the same power source (in this case, first power source 402) before first bus tie breaker 432 and second bus tie breaker 444 are closed. To help achieve this, electric power distribution system 400 employs a key interlock system and method that prohibits access to a key that is required to close second bus tie breaker 444 until at least a determination is made that first bypass breaker 460 of static transfer switch 406 has been closed. As will be discussed below, a solenoid key release unit 474 that is integrated with static transfer switch 406 is energized when at least first bypass breaker 460 is closed, thereby causing a key to be released from solenoid key release unit 474 that can then be used to obtain the key needed to close second bus tie breaker 444.

In accordance with the key interlock system and method of electric power distribution system 400, a first key interlock device 464 is mounted proximate to first bypass breaker 460, a second key interlock device 466 is mounted proximate to second bypass breaker 462, a third key interlock device 468 is mounted proximate to main breaker 422, a fourth key interlock device 470 is mounted proximate to main breaker 434, and a fifth key interlock device 472 is mounted proximate to second bus tie breaker 444. The key interlock system and method further includes a solenoid key release unit 474, a key transfer block 476, a first key (denoted "2K1" in FIG. 4), a second key (denoted "2K3" in FIG. 4), a third key (denoted "K6" in FIG. 4), and first, second and third copies of a fourth key (denoted "2K5" in FIG. 4).

First key interlock device 464 is operable to be transitioned from a first state to a second state using the first key (2K1). The first state of first key interlock device 464 comprises a state in which first key interlock device 464 impedes closing of first bypass breaker 460, allows insertion and removal of the first key (2K1), and prevents removal of the second key (2K3). The second state of first key interlock device 464 comprises a state in which first key interlock device 464 does not impede the closing of first bypass breaker 460, enables insertion and removal of the second key (2K3), and prevents removal of the first key (2K1). First key interlock device 464 may be of a same or similar design as first key interlock device 164 as described above in reference to FIG. 2.

Second key interlock device 466 is operable to be transitioned from a first state to a second state using the first key (2K1). The first state of second key interlock device 466 comprises a state in which second key interlock device 466 impedes closing of second bypass breaker 462 and allows insertion and removal of the first key (2K1). The second state of second key interlock device 466 comprises a state in which second key interlock device 466 does not impede the closing of second bypass breaker 462 and prevents removal of the first key (2K1) from second key interlock device 466. Second key interlock device 466 may be of a same or similar design as second key interlock device 166 as described above in reference to FIG. 3.

Third key interlock device 468 is operable to be transitioned from a first state to a second state using a copy of the fourth key (2K5). The first state of third key interlock device 468 comprises a state in which third key interlock device 468 impedes closing of main breaker 422 and allows insertion and removal of the copy of the fourth key (2K5). The second state of third key interlock device 468 comprises a state in which third key interlock device 468 does not impede the closing of main breaker 422 and prevents removal of the copy of the fourth key (2K5) from third key interlock device 468. Third key interlock device 468 may be of a same or similar design as second key interlock device 166 as described above in reference to FIG. 3.

Fourth key interlock device 470 is operable to be transitioned from a first state to a second state using a copy of the fourth key (2K5). The first state of fourth key interlock device 470 comprises a state in which fourth key interlock device 470 impedes closing of main breaker 434 and allows insertion and removal of the copy of the fourth key (2K5). The second state of fourth key interlock device 470 comprises a state in which fourth key interlock device 470 does not impede the closing of main breaker 434 and prevents removal of the copy of the fourth key (2K5) from fourth key interlock device 470. Fourth key interlock device 470 may be of a same or similar design as second key interlock device 166 as described above in reference to FIG. 3.

Fifth key interlock device 472 is operable to be transitioned from a first state to a second state using a copy of the fourth key (2K5). The first state of fifth key interlock device 472 comprises a state in which fifth key interlock device 472 impedes closing of second bus tie breaker 444 and allows insertion and removal of the copy of the fourth key (2K5). The second state of fifth key interlock device 472 comprises a state in which fifth key interlock device 472 does not impede the closing of second bus tie breaker 444 and prevents removal of the copy of the fourth key (2K5) from fifth key interlock device 472. Fifth key interlock device 472 may be of a same or similar design as second key interlock device 166 as described above in reference to FIG. 3.

Solenoid key release unit 474 is a component that is integrated with static transfer switch 406 and that is operable to be placed in a non-energized state when at least first bypass breaker 460 is open and to be placed in an energized state when at least first bypass breaker 460 is closed. When in the non-energized state, solenoid key release unit 474 prevents removal of the third key (K6) therefrom. When in the energized state, solenoid key release unit 474 enables removal of the third key (K6) therefrom.

Figure 5:
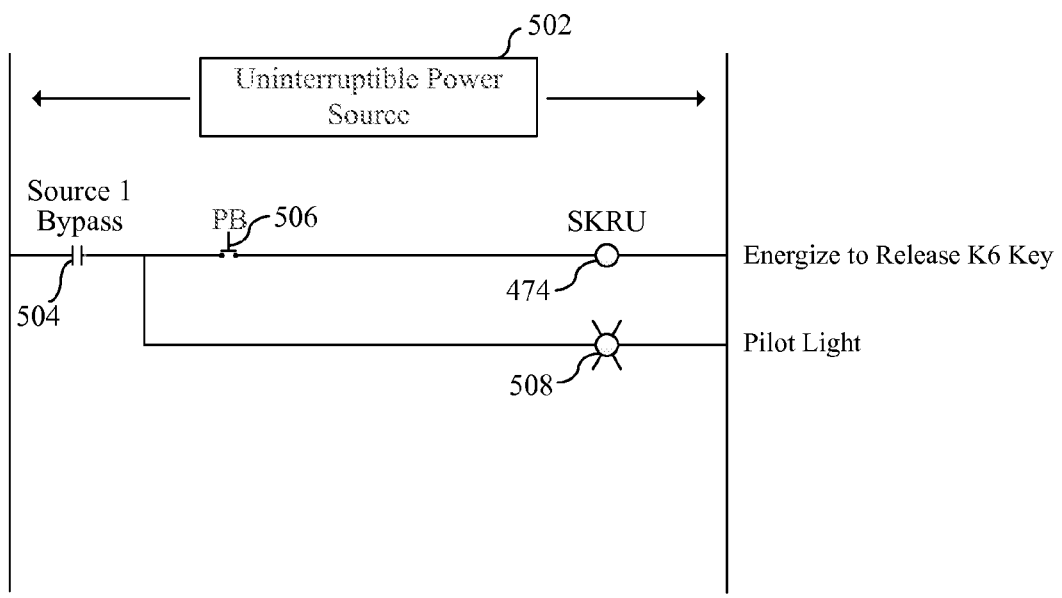
FIG. 5 is a diagram of a solenoid key release unit and associated activation logic that may be used to implement a key interlock system in accordance with an embodiment.

In an embodiment, solenoid key release unit 474 is configured to release the third key (K6) only when first bypass breaker 460 is closed and an operator has also pressed a push button associated with solenoid key release unit 474. FIG. 5 is a diagram of solenoid key release unit 474 and associated activation logic that may be used in such an embodiment.

As shown in FIG. 5, solenoid key release unit 474 is connected to a first terminal of an uninterruptible power source 502 and is also connected to a push button 506. Push button 506 is further connected to an auxiliary contact 504 that is linked to first bypass breaker 460 in a well-known manner. Auxiliary contact 504 is further connected to a second terminal of uninterruptible power source 502. As further shown in FIG. 5, a pilot light 508 is connected to the first terminal of uninterruptible power source 502 and is also connected to auxiliary contact 504. In one embodiment, uninterruptible power source 502 comprises a 125 VDC station battery, although other types of power sources may be used. In an embodiment, a power source that is different than first power source 402 and second power source 404 is utilized to energize solenoid key release unit 474.

The manner of operation of the logic shown in FIG. 5 will now be described. When first bypass breaker 460 is open, then auxiliary contact 504 will also be open, which means that solenoid key release unit 474 cannot be energized (regardless of the state of push button 506) and pilot light 508 will be off. When first bypass breaker 460 is closed, then auxiliary contact 504 will also be closed, which means that pilot light 508 will be powered by uninterruptible power source 502 and will turn on (i.e., be lit). This activation of pilot light 508 is intended to provide an extra indication to an operator that first bypass breaker 460 is closed. While first bypass breaker 460 is closed and push button 506 is not being pressed, solenoid key release unit 474 still cannot be energized due to the configuration of the logic shown in FIG. 5. However, if first bypass breaker 460 is closed and an operator presses push button 506, then solenoid key release unit 474 will be energized by uninterruptible power source 502 and release the third key (K6). By requiring the operator to press push button 506 to energize solenoid key release unit 474 and release the third key (K6) when first bypass breaker 460 is closed, the logic shown in FIG. 5 advantageously limits the amount of power that can be consumed by solenoid key release unit 474 while first bypass breaker 502 is closed.

Figure 6:
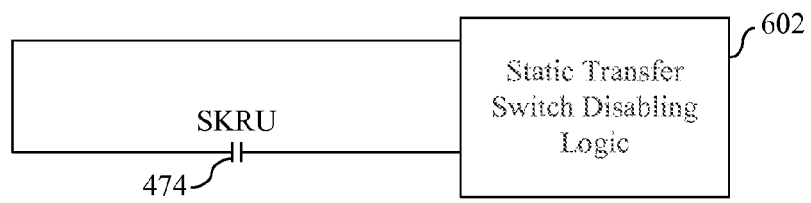
FIG. 6 is a diagram of a solenoid key release unit and associated static transfer switch disabling logic that may be used to implement a key interlock system in accordance with an embodiment.

In a further embodiment depicted in FIG. 6, solenoid key release unit 474 is further connected to static transfer switch disabling logic 602. In accordance with such an embodiment, when the third key (K6) is removed from solenoid key release unit 474, solenoid key release unit 474 detects this and sends an input signal to static transfer switch disabling logic 602 that causes such logic to disable the operation of switching logic 450. This provides yet another safeguard for ensuring that first load bus 410 is not being powered by second power source 404 when second bus tie breaker 444 is closed.

Returning now to the description of FIG. 4, key transfer block 476 comprises a component that is operable to be transitioned from a first state to a second state using both the second key (2K3) and the third key (K6). The first state of key transfer block 476 comprises a state in which key transfer block 476 prevents removal of a copy of the fourth key (2K5) therefrom and the second state of key transfer block 476 comprises a state in which key transfer block 476 enables removal of the copy of fourth key (2K5) therefrom.

Figure 7:
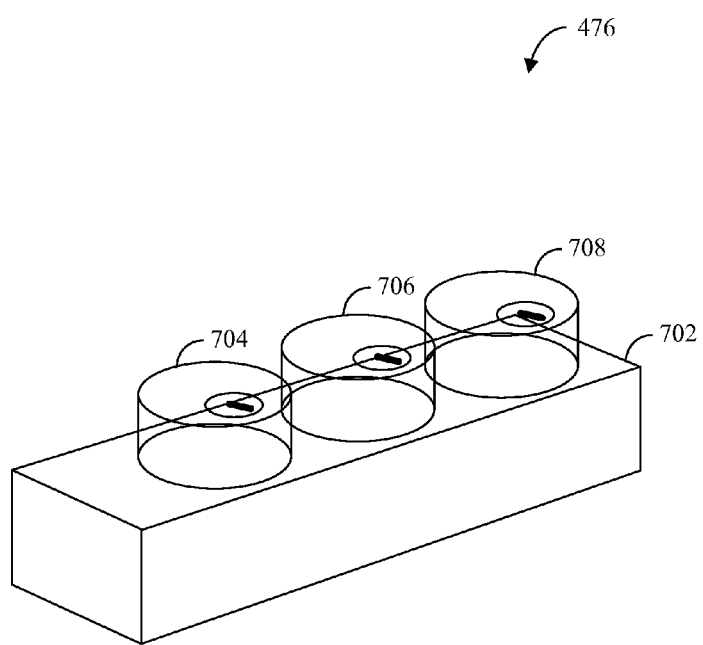
FIG. 7 depicts a perspective view of a key transfer block in accordance with an embodiment.

For example, key transfer block 476 may be implemented in a manner shown in FIG. 7. As illustrated in that figure, key transfer block 476 may comprise a housing 702, a first lock cylinder 704, a second lock cylinder 706, and a third lock cylinder 708. First lock cylinder 704 is configured to receive the second key (2K3) and is rotatable thereby. Second lock cylinder 706 is configured to receive the third key (K6) and is rotatable thereby. When both first lock cylinder 704 and second lock cylinder 706 have been rotated by their respective keys, then key transfer block 476 will be placed in a state in which a copy of the fourth key (2K5) will be released from third lock cylinder 708. Thus, both the second key (2K3) and the third key (K6) are required to access the copy of the fourth key (2K5) that is held by key transfer block 476.

A closed-transition procedure in accordance with the key interlock system and method implemented by electric power distribution system 400 will now be described. For the purpose of this explanation, it will be assumed that the following operational state exists before an operator initiates the closed-transition procedure:

With respect to static transfer switch 406: first source input breaker 452, second source input breaker 454, first load breaker 456, and second load breaker 458 are closed, while first bypass breaker 460 and second bypass breaker 462 are open;

First key interlock device 464 is in its first state (impeding the closing of first bypass breaker 460, allowing insertion and removal of the first key (2K1), and preventing removal of the second key (2K3));

Second key interlock device 466 is in its first state (impeding the closing of second bypass breaker 462 and allowing insertion and removal of the first key (2K1));

Since first bypass breaker 460 is open, the third key (K6) is captured by solenoid key release unit 474 such that it cannot be removed therefrom;

A copy of the fourth key (2K5) is captured by key transfer block 476 such that it cannot be removed therefrom;

With respect to first switchboard 446: main breaker 422, first bus tie breaker 432, and distribution breakers 424, 426, 428 and 430 are all closed;

Third key interlock device 468 is in its second state (not impeding the closing of main breaker 422 and preventing removal of a copy of the fourth key (2K5));

With respect to second switchboard 448: main breaker 434 and distribution breakers 436, 438, 440 and 442 are closed, while second bus tie breaker 444 is open;

Fourth key interlock device 470 is in its second state (not impeding the closing of main breaker 434 and preventing removal of a copy of the fourth key (2K5)); and Fifth key interlock device 472 is in its first state (impeding the closing of second bus tie breaker 444 and allowing insertion and removal of a copy of the fourth key (2K5)).

Thus, in accordance with this initial operating state, static transfer switch 406 is selectively supplying power to first load bus 410 from one of first power source 402 or second power source 404, first power source 402 is supplying power to second load bus 414, and first load bus 410 and second load bus 414 are not electrically connected because second bus tie breaker 444 is open.

Furthermore, in accordance with this initial operating state, the first key (2K1) is available for use by the operator, while the second key (2K3) is captured by first interlock device 464, the third key (K6) is captured by solenoid key release unit 474, and all three copies of the fourth key (2K5) are captured—one by key transfer block 476, one by third key interlock device 468, and one by fourth key interlock device 470. Thus, the operator cannot currently close second bus tie breaker 444 since there are no copies of the fourth key (2K5) available to change the state of fifth key interlock device 472 such that it is not impeding the closing of that breaker.

Figure 8:
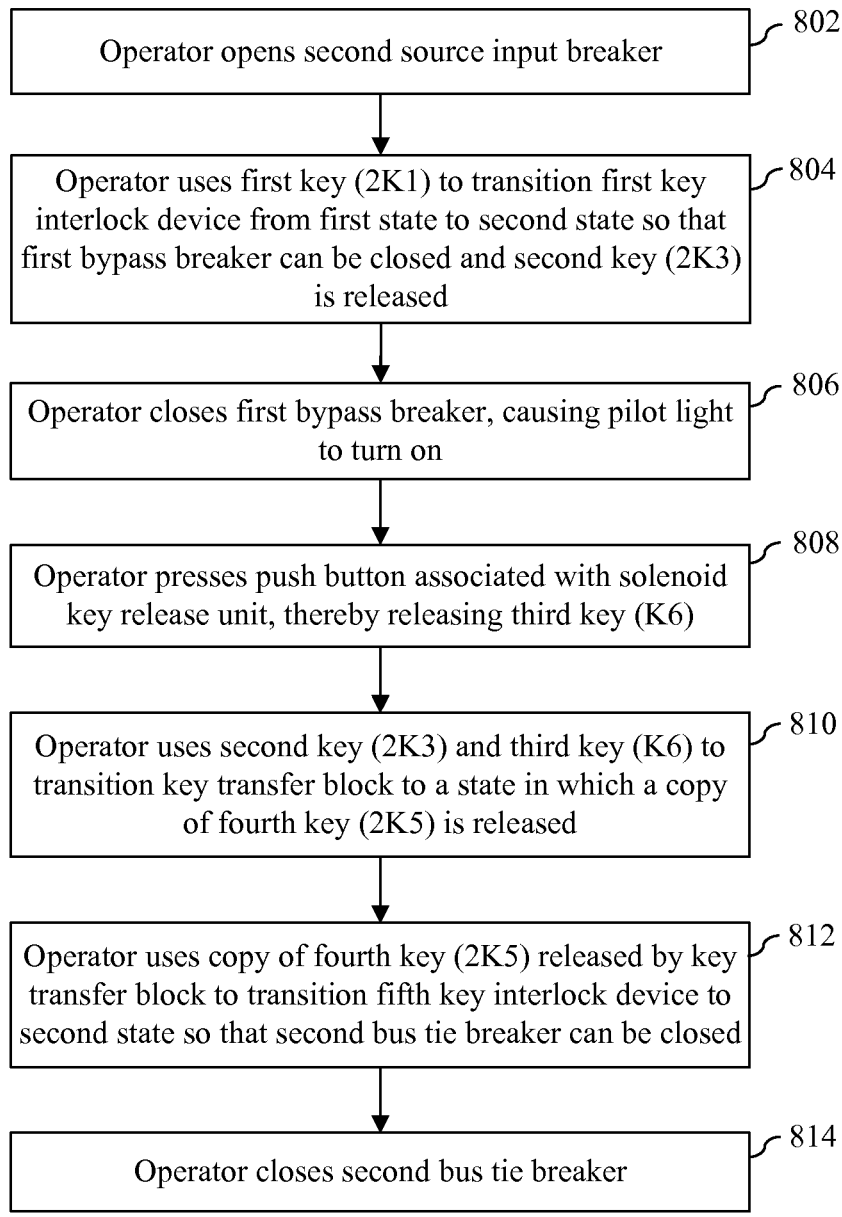
FIG. 8 depicts a flowchart a method for performing a closed-transition procedure in accordance with the key interlock system of FIG. 4.

A method for performing a closed-transition procedure in accordance with the key interlock system described above in reference to FIG. 4 will now be described in reference to flowchart 800 of FIG. 8.

At step 802, the operator opens second source input breaker 454.

At step 804, the operator uses the first key (2K1) to transition first key interlock device 464 from its first state to its second state. At this point, first key interlock device 464 no longer impedes the closing of first bypass breaker 460 and also allows removal of the second key (2K3).

At step 806, the operator closes first bypass breaker 460. As noted above, in an embodiment, this causes a pilot light (e.g., pilot light 508) to be turned on. The turning on of the pilot light serves as a confirmation to the operator that first bypass breaker 460 is closed and also indicates to the operator that the third key (K6) can be removed from solenoid key release unit 474 by pressing a push button (e.g., push button 506).

At step 808, the operator presses the push button (e.g., push button 506) which causes the third key (K6) to be released by solenoid key release unit 474.

At step 810, the operator uses the second key (2K3) and the third key (K6) to transition key transfer block 476 to a state in which a copy of the fourth key (2K5) can be removed therefrom.

At step 812, the operator then takes the copy of the fourth key (2K5) that was released from key transfer block 476 and uses it to transition fifth key interlock device 472 from its first state to its second state. At this point, fifth key interlock device 472 is not impeding the closing of second bus tie breaker 444.

At step 814, the operator then closes second bus tie breaker 444, thereby electrically connecting first load bus 410 to second load bus 414 while they are both being powered by the same power source. After this point, static transfer switch 406 can be disconnected from first load bus 410 (e.g., by transitioning third key interlock device 468 from its second state to its first state and then opening main breaker 422) without any discontinuity of power to the loads connected to first load bus 410.

The foregoing key interlock system and method improves upon that described in the previous section in a number of ways. For example, since key transfer block 476 will not release the copy of the fourth key (2K5) required to close second bus tie breaker 444 without first receiving the third key (K6), and since the third key (K6) will not be released by solenoid key release unit 474 until first bypass breaker 460 is closed, this key interlock system and method ensures that first bypass breaker 460 has been closed before the operator is permitted to close second bus tie breaker 444. Furthermore, since key transfer block 476 also captures the second key (2K3) that was released by first key interlock device 464, this key interlock system and method ensures that the operator cannot close second bus tie breaker 444 and then use the second key (2K3) to go back and open first bypass breaker 460 and then possibly close second bypass breaker 466. Additionally, since the removal of the third key (K6) causes switching logic 450 of static transfer switch 406 to be disabled, this provides a further safeguard for ensuring that first load bus 410 is not being powered by second power source 404 when second bus tie breaker 444 is closed.

Figure 9:
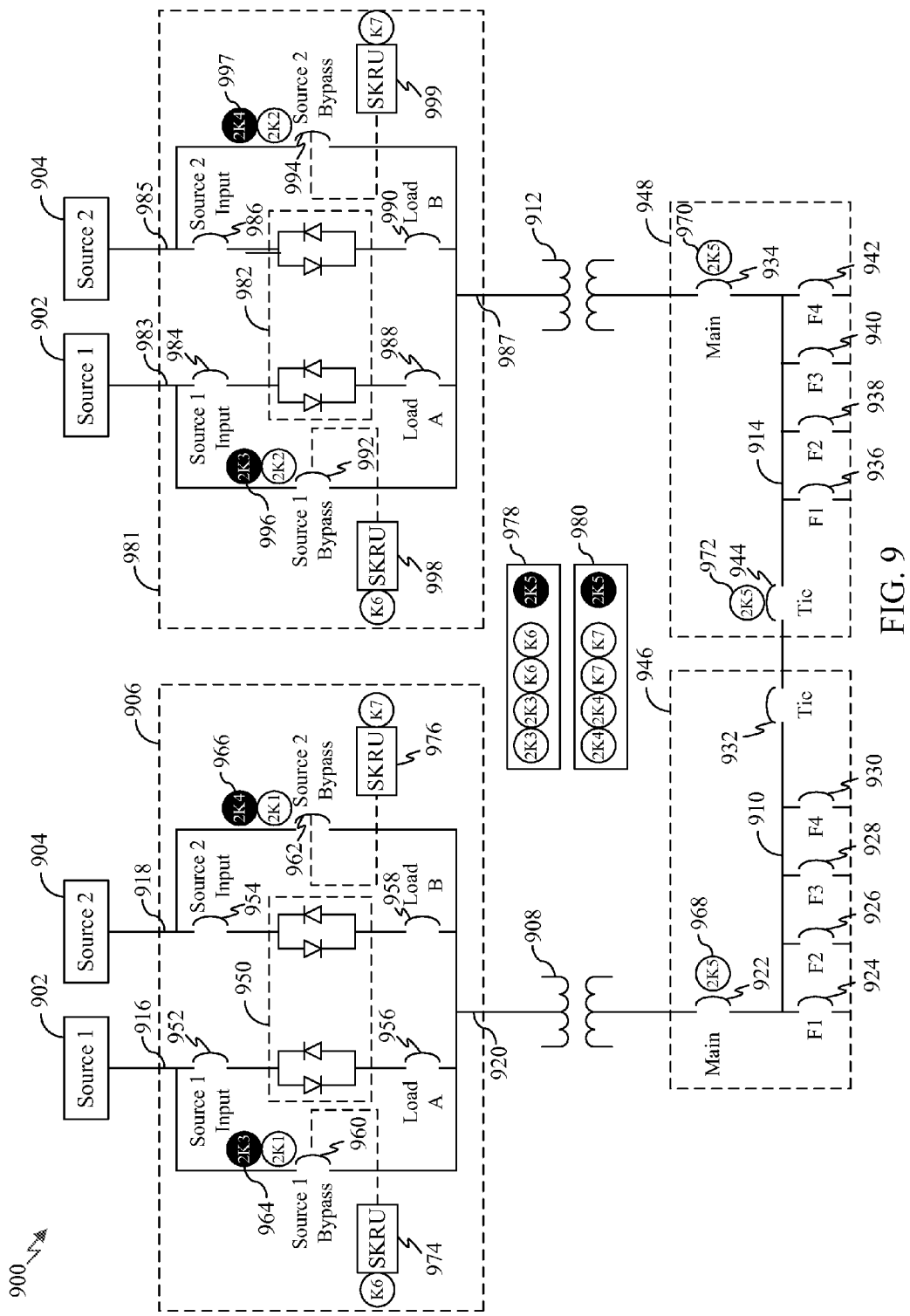
FIG. 9 is a block diagram of an electric power distribution system having a main-tie-tie-main configuration and two static transfer switches, the electric power distribution system implementing an improved key interlock system to ensure safe performance of a closed-transition procedure in accordance with an embodiment.

A variant of the foregoing key interlock system and method that can be used in electric power distribution systems having a main-tie-tie-main or similar configuration and two static transfer switches will now be described in reference to FIG. 9. In particular, FIG. 9 is a block diagram of an electric power distribution system 900 that has a main-tie-tie-main configuration and two static transfer switches.

Electric power distribution system 900 includes a first power source 902, a second power source 904, a first static transfer switch 906, a first transformer 908, a first load bus 910, a second static transfer switch 981, a second transformer 912, and a second load bus 914. First power source 902, second power source 904, first transformer 908, first load bus 910, second transformer 912 and second load bus 914 may be structurally, functionally and/or operationally equivalent to first power source 402, second power source 404, first transformer 408, first load bus 410, second transformer 412, and second load bus 414, respectively, of electric power distribution system 400.

First static transfer switch 906 includes a first power connection 916, a second power connection 918, a third power connection 920, switching logic 950, a first source input breaker 952, a second source input breaker 954, a first load breaker 956, a second load breaker 958, a first bypass breaker 960 and a second bypass breaker 962 that may be structurally, functionally and/or operationally equivalent to first power connection 416, second power connection 418, third power connection 420, switching logic 450, first source input breaker 452, second source input breaker 454, first load breaker 456, second load breaker 458, first bypass breaker 460 and second bypass breaker 462, respectively, of static transfer switch 406. Generally speaking, first static transfer switch 906 can operate to distribute electric power supplied by either first power source 902 or second power source 904 to first load bus 910 to which first static transfer switch 906 is connected via third power connection 920.

Second static transfer switch 981 includes a first power connection 983, a second power connection 985, a third power connection 987, switching logic 982, a first source input breaker 984, a second source input breaker 986, a first load breaker 988, a second load breaker 990, a first bypass breaker 992 and a second bypass breaker 994 that may be structurally, functionally and operationally equivalent to first power connection 416, second power connection 418, third power connection 420, switching logic 450, first source input breaker 452, second source input breaker 454, first load breaker 456, second load breaker 458, first bypass breaker 460 and second bypass breaker 462, respectively, of static transfer switch 406. Generally speaking, second static transfer switch 981 can operate to distribute electric power supplied by either first power source 902 or second power source 904 to second load bus 914 to which second static transfer switch 981 is connected via third power connection 987.

Electric power distribution system 900 also includes a first switchboard 946, a main breaker 922, distribution breakers 924, 926, 928, 930, a first bus tie breaker 932, a second switchboard 948, a second main breaker 934, distribution breakers 936, 938, 940, 942, and a second bus tie breaker 944 which may be structurally, functionally and/or operationally equivalent to first switchboard 446, main breaker 422, distribution breakers 424, 426, 428, 430, first bus tie breaker 432, second switchboard 448, second main breaker 434, distribution breakers 436, 438, 440, 442 and second bus tie breaker 444, respectively, of electric power distribution system 400.

It may be desired to perform a closed-transition procedure in a manner that ensures that first load bus 910 and second load bus 914 are both being powered by the same power source (in this case, either first power source 902 or second power source 904) before first bus tie breaker 932 and second bus tie breaker 944 are closed. To help achieve this, electric power distribution system 900 employs a key interlock system and method that prohibits access to a key that is required to close second bus tie breaker 944 until at least a determination is made that either (a) first bypass breaker 960 of first static transfer switch 906 has been closed and first bypass breaker 992 of second static transfer switch 981 has been closed, or (b) second bypass breaker 962 of first static transfer switch 906 has been closed and second bypass breaker 994 of second static transfer switch 981 has been closed.

In accordance with the key interlock system and method of electric power distribution system 900, a first key interlock device 964 is mounted proximate to first bypass breaker 960, a second key interlock device 966 is mounted proximate to second bypass breaker 962, a third key interlock device 996 is mounted proximate to first bypass breaker 992, a fourth key interlock device 997 is mounted proximate to second bypass breaker 994, a fifth key interlock device 968 is mounted proximate to main breaker 922, a sixth key interlock device 970 is mounted proximate to main breaker 934, and a seventh key interlock device 972 is mounted proximate to second bus tie breaker 944. The key interlock system and method further includes a solenoid key release unit 974, a solenoid key release unit 976, a solenoid key release unit 998, a solenoid key release unit 999, a key transfer block 978, a key transfer block 980, a first key (denoted "2K1" in FIG. 9), a second key (denoted "2K2" in FIG. 9), two copies of a third key (denoted "2K3" in FIG. 9), two copies of a fourth key (denoted "2K4" in FIG. 9), two copies of a fifth key (denoted "K6" in FIG. 9), two copies of a sixth key (denoted "K7" in FIG. 9), and first, second, third and fourth copies of a seventh key (denoted "2K5" in FIG. 9).

First key interlock device 964 is operable to be transitioned from a first state to a second state using the first key (2K1). The first state of first key interlock device 964 comprises a state in which first key interlock device 964 impedes closing of first bypass breaker 960, allows insertion and removal of the first key (2K1), and prevents removal of a copy of the third key (2K3). The second state of first key interlock device 964 comprises a state in which first key interlock device 964 does not impede the closing of first bypass breaker 960, enables insertion and removal of the copy of the third key (2K3), and prevents removal of the first key (2K1). First key interlock device 964 may be of a same or similar design as first key interlock device 164 as described above in reference to FIG. 2.

Second key interlock device 966 is operable to be transitioned from a first state to a second state using the first key (2K1). The first state of second key interlock device 966 comprises a state in which second key interlock device 966 impedes closing of second bypass breaker 962, allows insertion and removal of the first key (2K1), and prevents removal of a copy of the fourth key (2K4). The second state of second key interlock device 966 comprises a state in which second key interlock device 966 does not impede the closing of second bypass breaker 962, enables insertion and removal of the copy of the fourth key (2K4), and prevents removal of the first key (2K1). Second key interlock device 966 may be of a same or similar design as first key interlock device 164 as described above in reference to FIG. 2.

Third key interlock device 996 is operable to be transitioned from a first state to a second state using the second key (2K2). The first state of third key interlock device 996 comprises a state in which third key interlock device 996 impedes closing of first bypass breaker 992, allows insertion and removal of the second key (2K2), and prevents removal of a copy of the third key (2K3). The second state of third key interlock device 996 comprises a state in which third key interlock device 996 does not impede the closing of first bypass breaker 992, enables insertion and removal of the copy of the third key (2K3), and prevents removal of the second key (2K2). Third key interlock device 996 may be of a same or similar design as first key interlock device 164 as described above in reference to FIG. 2.

Fourth key interlock device 997 is operable to be transitioned from a first state to a second state using the second key (2K2). The first state of fourth key interlock device 997 comprises a state in which fourth key interlock device 997 impedes closing of second bypass breaker 994, allows insertion and removal of the second key (2K2), and prevents removal of a copy of the fourth key (2K4). The second state of fourth key interlock device 997 comprises a state in which fourth key interlock device 997 does not impede the closing of second bypass breaker 994, enables insertion and removal of the copy of the fourth key (2K4), and prevents removal of the second key (2K2). Fourth key interlock device 997 may be of a same or similar design as first key interlock device 164 as described above in reference to FIG. 2.

Fifth key interlock device 968 is operable to be transitioned from a first state to a second state using a copy of the seventh key (2K5). The first state of fifth key interlock device 968 comprises a state in which fifth key interlock device 968 impedes closing of main breaker 922 and allows insertion and removal of the copy of the seventh key (2K5). The second state of fifth key interlock device 968 comprises a state in which fifth key interlock device 968 does not impede the closing of main breaker 922 and prevents removal of the copy of the seventh key (2K5) from fifth key interlock device 968. Fifth key interlock device 968 may be of a same or similar design as second key interlock device 166 as described above in reference to FIG. 3.

Sixth key interlock device 970 is operable to be transitioned from a first state to a second state using a copy of the seventh key (2K5). The first state of sixth key interlock device 970 comprises a state in which sixth key interlock device 970 impedes closing of main breaker 934 and allows insertion and removal of the copy of the seventh key (2K5). The second state of sixth key interlock device 970 comprises a state in which sixth key interlock device 970 does not impede the closing of main breaker 934 and prevents removal of the copy of the seventh key (2K5) from sixth key interlock device 970. Sixth key interlock device 970 may be of a same or similar design as second key interlock device 166 as described above in reference to FIG. 3.

Seventh key interlock device 972 is operable to be transitioned from a first state to a second state using a copy of the seventh key (2K5). The first state of seventh key interlock device 972 comprises a state in which seventh key interlock device 972 impedes closing of second bus tie breaker 944 and allows insertion and removal of the copy of the seventh key (2K5). The second state of seventh key interlock device 972 comprises a state in which seventh key interlock device 972 does not impede the closing of second bus tie breaker 944 and prevents removal of the copy of the seventh key (2K5) from seventh key interlock device 972. Seventh key interlock device 972 may be of a same or similar design as second key interlock device 166 as described above in reference to FIG. 3.

Solenoid key release unit 974 is a component that is integrated with first static transfer switch 906 and that is operable to be placed in a non-energized state when at least first bypass breaker 960 is open and to be placed in an energized state when at least first bypass breaker 960 is closed. When in the non-energized state, solenoid key release unit 974 prevents removal of a copy of the fifth key (K6) therefrom. When in the energized state, solenoid key release unit 974 enables removal of the copy of the fifth key (K6) therefrom.

Solenoid key release unit 976 is a component that is integrated with first static transfer switch 906 and that is operable to be placed in a non-energized state when at least second bypass breaker 962 is open and to be placed in an energized state when at least second bypass breaker 962 is closed. When in the non-energized state, solenoid key release unit 976 prevents removal of a copy of the sixth key (K7) therefrom. When in the energized state, solenoid key release unit 976 enables removal of the copy of the sixth key (K7) therefrom.

Solenoid key release unit 998 is a component that is integrated with second static transfer switch 981 and that is operable to be placed in a non-energized state when at least first bypass breaker 992 is open and to be placed in an energized state when at least first bypass breaker 992 is closed. When in the non-energized state, solenoid key release unit 998 prevents removal of a copy of the fifth key (K6) therefrom. When in the energized state, solenoid key release unit 998 enables removal of the copy of the fifth key (K6) therefrom.

Solenoid key release unit 999 is a component that is integrated with second static transfer switch 981 and that is operable to be placed in a non-energized state when at least second bypass breaker 994 is open and to be placed in an energized state when at least second bypass breaker 994 is closed. When in the non-energized state, solenoid key release unit 999 prevents removal of a copy of the sixth key (K7) therefrom. When in the energized state, solenoid key release unit 999 enables removal of the copy of the sixth key (K7) therefrom.

Figure 10:
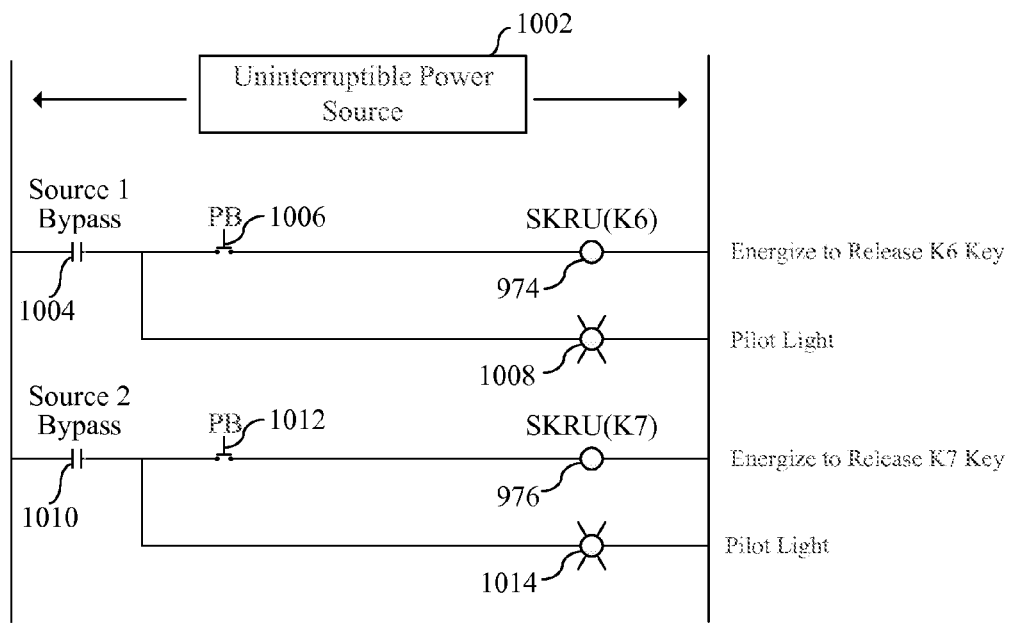
FIG. 10 is a diagram of dual solenoid key release units and associated activation logic that may be used to implement a key interlock system in accordance with an embodiment.

In an embodiment, solenoid key release unit 974 is configured to release the copy of the fifth key (K6) only when first bypass breaker 960 is closed and an operator has also pressed a push button associated with solenoid key release unit 974 and solenoid key release unit 976 is configured to release the copy of the sixth key (K7) only when second bypass breaker 962 is closed and an operator has also pressed a push button associated with solenoid key release unit 976. FIG. 10 is a diagram of solenoid key release units 974, 976 and associated activation logic that may be used in such an embodiment.

As shown in FIG. 10, solenoid key release unit 974 is connected to a first terminal of an uninterruptible power source 1002 and is also connected to a push button 1006. Push button 1006 is further connected to an auxiliary contact 1004 that is linked to first bypass breaker 960 in a well-known manner. Auxiliary contact 1004 is further connected to a second terminal of uninterruptible power source 1002. A pilot light 1008 is connected to the first terminal of uninterruptible power source 1002 and is also connected to auxiliary contact 1004. As further shown in FIG. 10, solenoid key release unit 976 is connected to the first terminal of uninterruptible power source 1002 and is also connected to a push button 1012. Push button 1012 is further connected to an auxiliary contact 1010 that is linked to second bypass breaker 962 in a well-known manner. Auxiliary contact 1010 is further connected to the second terminal of uninterruptible power source 1002. A pilot light 1014 is connected to the first terminal of battery 1002 and is also connected to auxiliary contact 1010.

In one embodiment, uninterruptible power source 1002 comprises a 125 VDC station battery, although other types of power sources may be used. In an embodiment, a power source that is different than first power source 902 and second power source 904 is utilized to energize solenoid key release units 974, 976. Furthermore, although only a single power source is shown in FIG. 10, in alternate embodiments different power sources may be used to energize solenoid key release units 974, 976.

The manner of operation of the logic shown in FIG. 10 will now be described. When first bypass breaker 960 is open, then auxiliary contact 1004 will also be open, which means that solenoid key release unit 974 cannot be energized (regardless of the state of push button 1006) and pilot light 1008 will be off. When first bypass breaker 960 is closed, then auxiliary contact 1004 will also be closed, which means that pilot light 1008 will be powered by uninterruptible power source 1002 and will turn on (i.e., be lit). This activation of pilot light 1008 is intended to provide an extra indication to an operator that first bypass breaker 960 is closed. While first bypass breaker 960 is closed and push button 1006 is not being pressed, solenoid key release unit 974 still cannot be energized due to the configuration of the logic shown in FIG. 10. However, if first bypass breaker 960 is closed and an operator presses push button 1006, then solenoid key release unit 974 will be energized by uninterruptible power source 1002 and release the copy of the fifth key (K6).

When second bypass breaker 962 is open, then auxiliary contact 1010 will also be open, which means that solenoid key release unit 976 cannot be energized (regardless of the state of push button 1012) and pilot light 1014 will be off. When second bypass breaker 962 is closed, then auxiliary contact 1010 will also be closed, which means that pilot light 1014 will be powered by uninterruptible power source 1002 and will turn on (i.e., be lit). This activation of pilot light 1014 is intended to provide an extra indication to an operator that second bypass breaker 962 is closed. While second bypass breaker 962 is closed and push button 1012 is not being pressed, solenoid key release unit 976 still cannot be energized due to the configuration of the logic shown in FIG. 10. However, if second bypass breaker 962 is closed and an operator presses push button 1012, then solenoid key release unit 976 will be energized by uninterruptible power source 1002 and release the copy of the fourth key (K7).

Using similar logic to that shown in FIG. 10, solenoid key release unit 998 may configured to release the copy of the fifth key (K6) only when first bypass breaker 992 is closed and an operator has also pressed a push button associated with solenoid key release unit 998 and solenoid key release unit 999 may be configured to release the copy of the sixth key (K7) only when second bypass breaker 994 is closed and an operator has also pressed a push button associated with solenoid key release unit 999.

Figure 11:
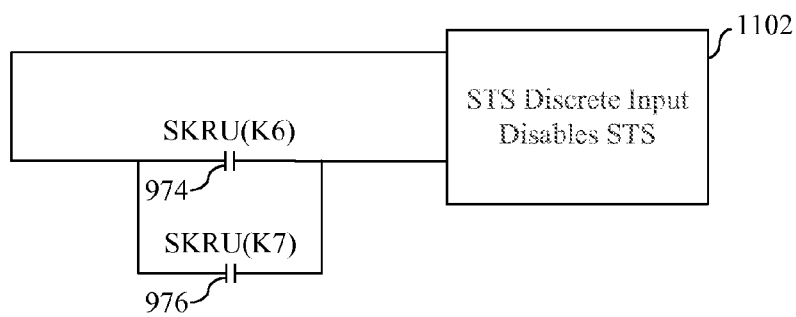
FIG. 11 is a diagram of dual solenoid key release units and associated static transfer switch disabling logic that may be used to implement a key interlock system in accordance with an embodiment.

In a further embodiment depicted in FIG. 11, solenoid key release unit 974 and solenoid key release unit 976 are further connected to static transfer switch disabling logic 1102. In accordance with such an embodiment, when the copy of the fifth key (K6) is removed from solenoid key release unit 974, solenoid key release unit 974 detects this and sends an input signal to static transfer switch disabling logic 1102 that causes such logic to disable the operation of switching logic 950. Likewise, when the copy of the sixth key (K7) is removed from solenoid key release unit 976, solenoid key release unit 976 detects this and sends an input signal to static transfer switch disabling logic 1102 that causes such logic to disable the operation of switching logic 950.

Using similar logic to that shown in FIG. 11, second static transfer switch 981 may be configured such that when the copy of the fifth key (K6) is removed from solenoid key release unit 998, solenoid key release unit 998 sends an input signal to static transfer switch disabling logic that causes such logic to disable the operation of switching logic 982. Likewise, second static transfer switch 981 may be configured such that when the copy of the sixth key (K7) is removed from solenoid key release unit 999, solenoid key release unit 999 sends an input signal to static transfer switch disabling logic that causes such logic to disable the operation of switching logic 982.

Returning now to the description of FIG. 9, key transfer block 978 comprises a component that is operable to be transitioned from a first state to a second state using both copies of the third key (2K3) and both copies of the fifth key (K6). The first state of key transfer block 978 comprises a state in which key transfer block 978 prevents removal of a copy of the seventh key (2K5) therefrom and the second state of key transfer block 978 comprises a state in which key transfer block 978 enables removal of the copy of seventh key (2K5) therefrom.

Figure 12:
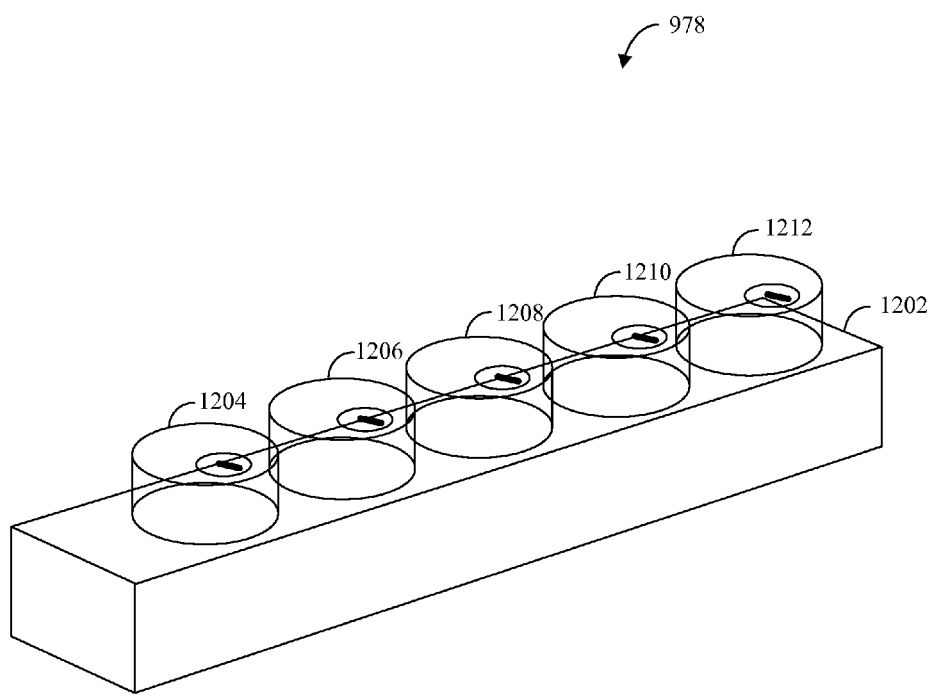
FIG. 12 depicts a perspective view of a key transfer block in accordance with an embodiment.

For example, key transfer block 978 may be implemented in a manner shown in FIG. 12. As illustrated in that figure, key transfer block 978 may comprise a housing 1202, a first lock cylinder 1204, a second lock cylinder 1206, a third lock cylinder 1208, a fourth lock cylinder 1210, and a fifth lock cylinder 1212. First lock cylinder 1204 is configured to receive one copy of the third key (2K3) and is rotatable thereby. Second lock cylinder 1206 is configured to receive the other copy of the third key (2K3) and is rotatable thereby. Third lock cylinder 1208 is configured to receive one copy of the fifth key (K6) and is rotatable thereby. Fourth lock cylinder 1210 is configured to receive the other copy of the fifth key (K6) and is rotatable thereby. When first lock cylinder 1204, second lock cylinder 1206, third lock cylinder 1208 and fourth lock cylinder 1210 have been rotated by their respective keys, then key transfer block 978 will be placed in a state in which a copy of the seventh key (2K5) will be released from fifth lock cylinder 1212. Thus, both copies of the third key (2K3) and both copies of the fifth key (K6) are required to access the copy of the seventh key (2K5) that is held by key transfer block 978.

Key transfer block 980 comprises a component that is operable to be transitioned from a first state to a second state using both copies of the fourth key (2K4) and both copies of the sixth key (K7). The first state of key transfer block 980 comprises a state in which key transfer block 980 prevents removal of a copy of the seventh key (2K5) therefrom and the second state of key transfer block 980 comprises a state in which key transfer block 978 enables removal of the copy of seventh key (2K5) therefrom. Key transfer block 980 may be of a same or similar design as key transfer block 978 as described above in reference to FIG. 12.

Two closed-transition procedures in accordance with the key interlock system and method implemented by electric power distribution system 400 will now be described—one in which both load busses are connected to first power source 902 and another in which both load busses are connected to second power source 904. For the purpose of this explanation, it will be assumed that the following operational state exists before an operator initiates either of the closed-transition procedures:

- With respect to first static transfer switch 906: first source input breaker 952, second source input breaker 954, first load breaker 956, and second load breaker 958 are closed, while first bypass breaker 960 and second bypass breaker 962 are open;
- First key interlock device 964 is in its first state (impeding the closing of first bypass breaker 960, allowing insertion and removal of the first key (2K1), and preventing removal of a copy of the third key (2K3));
- Second key interlock device 966 is in its first state (impeding the closing of second bypass breaker 962, allowing insertion and removal of the first key (2K1), and preventing removal of a copy of the fourth key (2K4));
- Since first bypass breaker 960 is open, a copy of the fifth key (K6) is captured by solenoid key release unit 974 such that it cannot be removed therefrom;
- Since second bypass breaker 962 is open, a copy of the sixth key (K7) is captured by solenoid key release unit 976 such that it cannot be removed therefrom;
- With respect to second static transfer switch 981: first source input breaker 984, second source input breaker 986, first load breaker 988, and second load breaker 990 are closed, while first bypass breaker 992 and second bypass breaker 994 are open;
- Third key interlock device 996 is in its first state (impeding the closing of first bypass breaker 992, allowing insertion and removal of the second key (2K2), and preventing removal of a copy of the third key (2K3));
- Fourth key interlock device 997 is in its first state (impeding the closing of second bypass breaker 994, allowing insertion and removal of the second key (2K2), and preventing removal of a copy of the fourth key (2K4));
- Since first bypass breaker 992 is open, a copy of the fifth key (K6) is captured by solenoid key release unit 998 such that it cannot be removed therefrom;
- Since second bypass breaker 994 is open, a copy of the sixth key (K7) is captured by solenoid key release unit 999 such that it cannot be removed therefrom;
- A copy of the seventh key (2K5) is captured by key transfer block 978 such that it cannot be removed therefrom;
- A copy of the seventh key (2K5) is captured by key transfer block 980 such that it cannot be removed therefrom;
- With respect to first switchboard 946: main breaker 922, first bus tie breaker 932, and distribution breakers 924, 926, 928 and 930 are all closed;
- Fifth key interlock device 968 is in its second state (not impeding the closing of main breaker 922 and preventing removal of a copy of the seventh key (2K5));
- With respect to second switchboard 948: main breaker 934 and distribution breakers 936, 938, 940 and 942 are closed, while second bus tie breaker 944 is open;
- Sixth key interlock device 970 is in its second state (not impeding the closing of main breaker 934 and preventing removal of a copy of the seventh key (2K5)); and
- Seventh key interlock device 972 is in its first state (impeding the closing of second bus tie breaker 944 and allowing insertion and removal of a copy of the seventh key (2K5)).

Thus, in accordance with this initial operating state, first static transfer switch 906 is selectively supplying power to first load bus 910 from one of first power source 902 or second power source 904, second static transfer switch 981 is selectively supplying power to second load bus 914 from one of first power source 902 or second power source 904, and first load bus 910 and second load bus 914 are not electrically connected because second bus tie breaker 944 is open.

Furthermore, in accordance with this initial operating state, the first key (2K1) and the second key (2K2) are both available for use by the operator, one copy of the third key (2K3) is captured by first interlock device 964 while the other copy of the third key (2K3) is captured by third interlock device 996, one copy of the fourth key (2K4) is captured by second interlock device 966 while the other copy of the fourth key (2K4) is captured by fourth interlock device 997, one copy of the fifth key (K6) is captured by solenoid key release unit 974 while the other copy of the fifth key (K6) is captured by solenoid key release unit 998, one copy of the sixth key (K7) is captured by solenoid key release unit 976 while the other copy of the sixth key (K7) is captured by solenoid key release unit 999, and all four copies of the seventh key (2K5) are captured—one by key transfer block 978, one by key transfer block 980, one by fifth key interlock device 968, and one by sixth key interlock device 970. Thus, the operator cannot currently close second bus tie breaker 944 since there are no copies of the seventh key (2K5) available to change the state of seventh key interlock device 972 such that it is not impeding the closing of that breaker.

Figure 13:
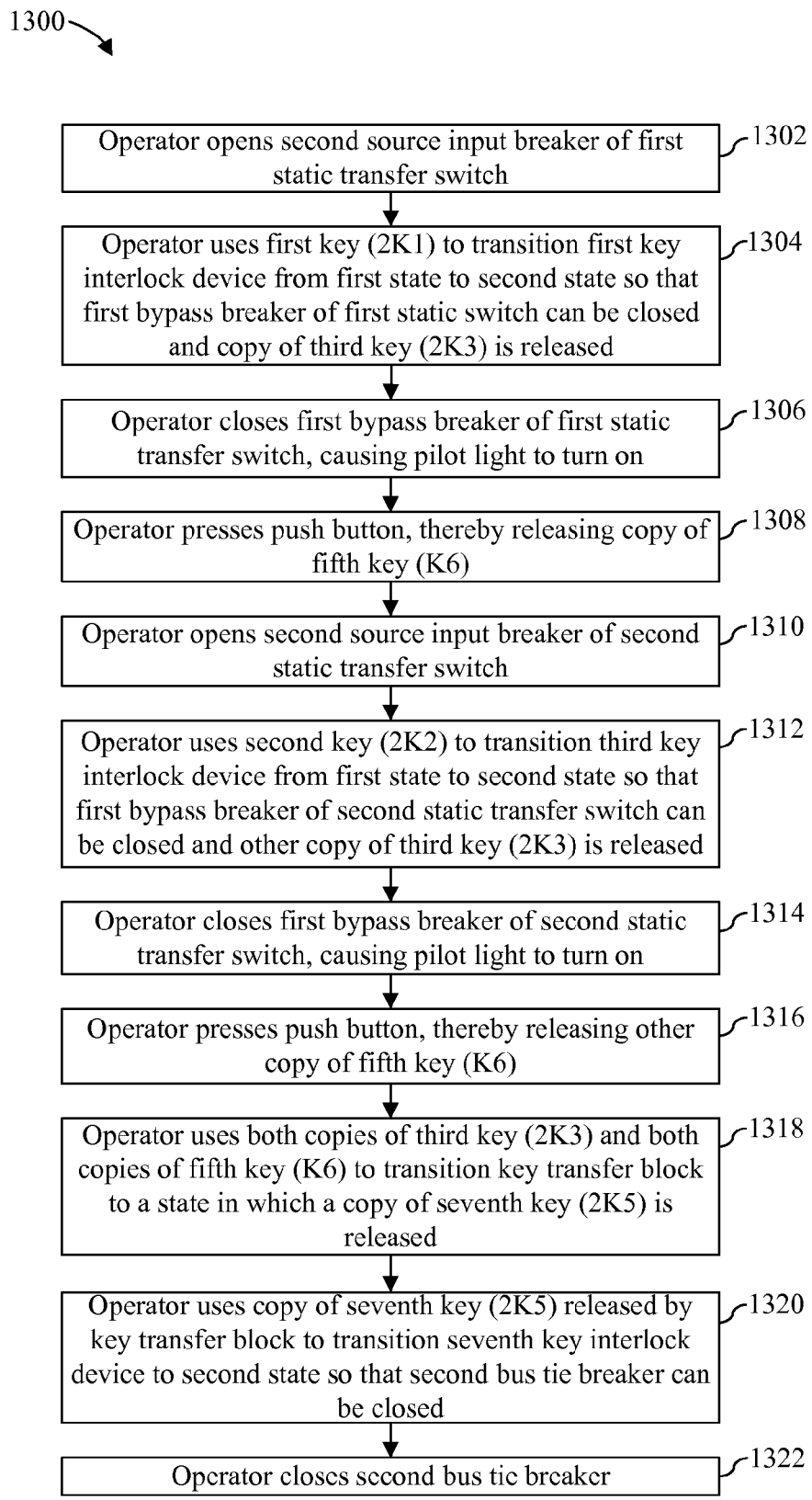
FIG. 13 depicts a flowchart of a first method for performing a closed-transition procedure in accordance with the key interlock system of FIG. 9.

A first method for performing a closed-transition procedure in accordance with the key interlock system described above in reference to FIG. 9 will now be described in reference to flowchart 1300 of FIG. 13.

At step 1302, the operator opens second source input breaker 954 of first static transfer switch 906.

At step 1304, the operator uses the first key (2K1) to transition first key interlock device 964 from its first state to its second state. At this point, first key interlock device 964 no longer impedes the closing of first bypass breaker 960 of first static transfer switch 906 and also allows removal of a copy of the third key (2K3).

At step 1306, the operator closes first bypass breaker 960. As noted above, in an embodiment, this causes a pilot light associated with solenoid key release unit 974 to be turned on. The turning on of the pilot light serves as a confirmation to the operator that first bypass breaker 960 is closed and also indicates to the operator that a copy of the fifth key (K6) can be removed from solenoid key release unit 974 by pressing a push button.

At step 1308, the operator presses the push button associated with solenoid key release unit 974 which causes the copy of the fifth key (K6) to be released by solenoid key release unit 974.

At step 1310, the operator opens second source input breaker 986 of second static transfer switch 981.

At step 1312, the operator uses the second key (2K2) to transition third key interlock device 996 from its first state to its second state. At this point, third key interlock device 996 no longer impedes the closing of first bypass breaker 992 of second static transfer switch 981 and also allows removal of a copy of the third key (2K3).

At step 1314, the operator closes first bypass breaker 992. As noted above, in an embodiment, this causes a pilot light associated with solenoid key release unit 998 to be turned on. The turning on of the pilot light serves as a confirmation to the operator that first bypass breaker 992 is closed and also indicates to the operator that a copy of the fifth key (K6) can be removed from solenoid key release unit 998 by pressing a push button.

At step 1316, the operator presses the push button associated with solenoid key release unit 998 which causes the copy of the fifth key (K6) to be released by solenoid key release unit 998.

At step 1318, the operator uses the two copies of the third key (2K3) and the two copies of the fifth key (K6) to transition key transfer block 978 to a state in which a copy of the seventh key (2K5) can be removed therefrom.

At step 1320, the operator then takes the copy of the seventh key (2K5) that was released from key transfer block 978 and uses it to transition seventh key interlock device 972 from its first state to its second state. At this point, seventh key interlock device 972 is not impeding the closing of second bus tie breaker 944.

At step 1322, the operator then closes second bus tie breaker 944, thereby electrically connecting first load bus 910 to second load bus 914 while they are both being powered by first power source 902. After this point, either first static transfer switch 906 can be disconnected from first load bus 910 (e.g., by transitioning fifth key interlock device 968 from its second state to its first state and then opening main breaker 922) or second static transfer switch 981 can be disconnected from second load bus 914 (e.g., by transitioning sixth key interlock device 970 from its second state to its first state and then opening main breaker 934) without any discontinuity of power to the loads connected to first load bus 910 or second load bus 914.

In accordance with the foregoing key interlock system and method, since key transfer block 978 will not release the copy of the seventh key (2K5) required to close second bus tie breaker 444 without first receiving both copies of the fifth key (K6), and since both copies of the fifth key (K6) will not be released by solenoid key release units 974, 998 until both first bypass breaker 960 and first bypass breaker 992 are closed, this key interlock system and method ensures that both first bypass breaker 960 and first bypass breaker 992 have been closed before the operator is permitted to close second bus tie breaker 944. Furthermore, since key transfer block 978 also captures both copies of the third key (2K3), this key interlock system and method ensures that the operator cannot close second bus tie breaker 944 and then use the copies of the third key (2K3) to go back and open first bypass breaker 960 or first bypass breaker 992 and possibly close second bypass breaker 966 or second bypass breaker 994. Additionally, since the removal of both copies of the fifth key (K6) causes switching logic 950 of first static transfer switch 906 to be disabled and switching logic 982 of second transfer switch 981 to be disabled, this provides a further safeguard for ensuring that first load bus 910 is not being powered by a different power source than second load bus 914 when second bus tie breaker 944 is closed.

Figure 14:
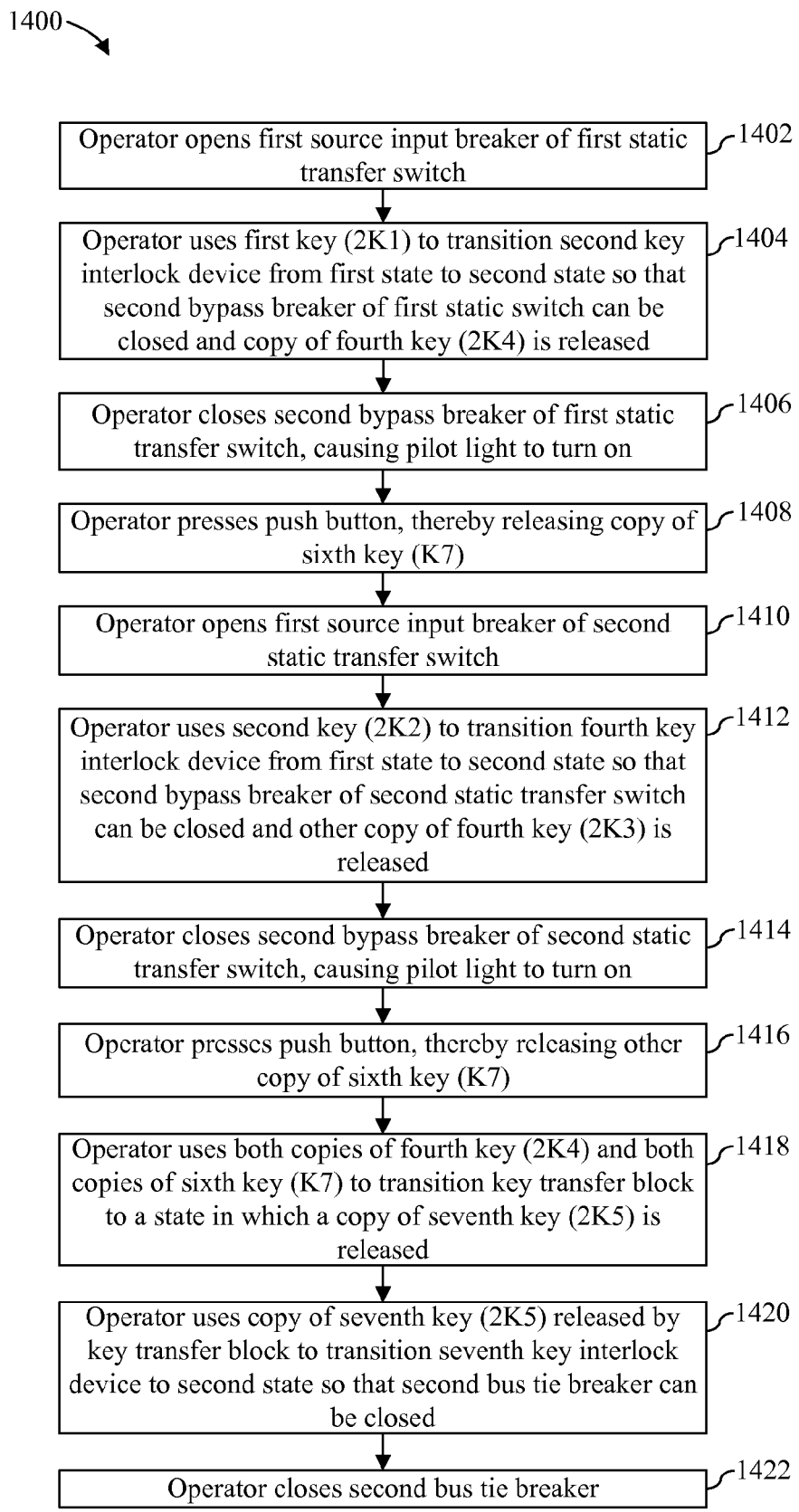
FIG. 14 depicts a flowchart of a second method for performing a closed-transition procedure in accordance with the key interlock system of FIG. 9.

A second method for performing a closed-transition procedure in accordance with the key interlock system described above in reference to FIG. 9 will now be described in reference to flowchart 1400 of FIG. 14.

At step 1402, the operator opens first source input breaker 952 of first static transfer switch 906.

At step 1404, the operator uses the first key (2K1) to transition second key interlock device 966 from its first state to its second state. At this point, second key interlock device 966 no longer impedes the closing of second bypass breaker 962 of first static transfer switch 906 and also allows removal of a copy of the fourth key (2K4).

At step 1406, the operator closes second bypass breaker 962. As noted above, in an embodiment, this causes a pilot light associated with solenoid key release unit 976 to be turned on. The turning on of the pilot light serves as a confirmation to the operator that second bypass breaker 962 is closed and also indicates to the operator that a copy of the sixth key (K7) can be removed from solenoid key release unit 976 by pressing a push button.

At step 1408, the operator presses the push button associated with solenoid key release unit 976 which causes the copy of the sixth key (K7) to be released by solenoid key release unit 976.

At step 1410, the operator opens first source input breaker 984 of second static transfer switch 981.

At step 1412, the operator uses the second key (2K2) to transition fourth key interlock device 997 from its first state to its second state. At this point, fourth key interlock device 997 no longer impedes the closing of second bypass breaker 994 of second static transfer switch 981 and also allows removal of a copy of the fourth key (2K4).

At step 1414, the operator closes second bypass breaker 994. As noted above, in an embodiment, this causes a pilot light associated with solenoid key release unit 999 to be turned on. The turning on of the pilot light serves as a confirmation to the operator that second bypass breaker 994 is closed and also indicates to the operator that a copy of the sixth key (K7) can be removed from solenoid key release unit 999 by pressing a push button.

At step 1416, the operator presses the push button associated with solenoid key release unit 999 which causes the copy of the sixth key (K7) to be released by solenoid key release unit 999.

At step 1418, the operator uses the two copies of the fourth key (2K4) and the two copies of the sixth key (K7) to transition key transfer block 980 to a state in which a copy of the seventh key (2K5) can be removed therefrom.

At step 1420, the operator then takes the copy of the seventh key (2K5) that was released from key transfer block 980 and uses it to transition seventh key interlock device 972 from its first state to its second state. At this point, seventh key interlock device 972 is not impeding the closing of second bus tie breaker 944.

At step 1422, the operator then closes second bus tie breaker 944, thereby electrically connecting first load bus 910 to second load bus 914 while they are both being powered by first power source 904. After this point, either first static transfer switch 906 can be disconnected from first load bus 910 (e.g., by transitioning fifth key interlock device 968 from its second state to its first state and then opening main breaker 922) or second static transfer switch 981 can be disconnected from second load bus 914 (e.g., by transitioning sixth key interlock device 970 from its second state to its first state and then opening main breaker 934) without any discontinuity of power to the loads connected to first load bus 910 or second load bus 914.

In accordance with the foregoing key interlock system and method, since key transfer block 980 will not release the copy of the seventh key (2K5) required to close second bus tie breaker 444 without first receiving both copies of the sixth key (K7), and since both copies of the sixth key (K7) will not be released by solenoid key release units 976, 999 until both second bypass breaker 962 and second bypass breaker 994 are closed, this key interlock system and method ensures that both second bypass breaker 962 and second bypass breaker 994 have been closed before the operator is permitted to close second bus tie breaker 944. Furthermore, since key transfer block 980 also captures both copies of the fourth key (2K4), this key interlock system and method ensures that the operator cannot close second bus tie breaker 944 and then use the copies of the fourth key (2K4) to go back and open second bypass breaker 962 or second bypass breaker 994 and possibly close first bypass breaker 960 or first bypass breaker 992. Additionally, since the removal of both copies of the sixth key (K7) causes switching logic 950 of first static transfer switch 906 to be disabled and switching logic 982 of second transfer switch 981 to be disabled, this provides a further safeguard for ensuring that first load bus 910 is not being powered by a different power source than second load bus 914 when second bus tie breaker 944 is closed.

Figure 15:
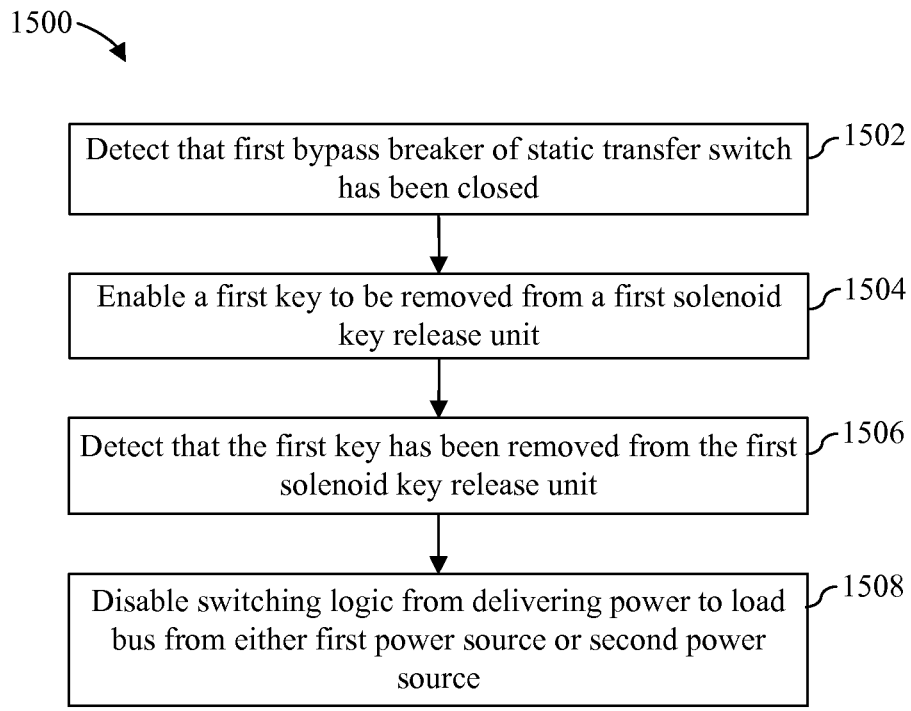
FIG. 15 depicts a flowchart of a method for automatically disabling switching logic of a static transfer switch having at least one bypass breaker in accordance with an embodiment.

FIG. 15 depicts a flowchart 1500 of a generalized method for automatically disabling switching logic of a static transfer switch having at least one bypass breaker in accordance with an embodiment. The method of flowchart 1500 may be implemented, for example, by static transfer switch 406 of electric power distribution system 400 or by one or more of first static transfer switch 906 and second static transfer switch 981 of electric power distribution system 900.

As shown in FIG. 15, the method of flowchart 1500 begins at step 1502 in which it is automatically detected that a first bypass breaker of the static transfer switch has been closed. For example, with respect to static transfer switch 406, this step may comprise detecting that first bypass breaker 460 has been closed. With respect to first static transfer switch 906, this step may comprise detecting that first bypass breaker 960 has been closed. With respect to second static transfer switch 981, this step may comprise detecting that first bypass breaker 992 has been closed.

At step 1504, in response to at least detecting that the first bypass breaker of the static transfer switch has been closed, a first key is enabled to be removed from a first solenoid key release unit. For example, with respect to static transfer switch 406, this step may comprise enabling the third key (K6) to be removed from solenoid key release unit 474 in response to at least detecting that first bypass breaker 460 has been closed. With respect to first static transfer switch 906, this step may comprise enabling the copy of the fifth key (K6) to be removed from solenoid key release unit 974 in response to at least detecting that first bypass breaker 960 has been closed. With respect to second static transfer switch 981, this step may comprise enabling the copy of the fifth key (K6) to be removed from solenoid key release unit 998 in response to at least detecting that first bypass breaker 992 has been closed.

At step 1506, it is automatically detected that a first key has been removed from the first solenoid key release unit. For example, with respect to static transfer switch 406, this step may comprise automatically detecting that the third key (K6) has been removed from solenoid key release unit 474. With respect to first static transfer switch 906, this step may comprise automatically detecting that the copy of the fifth key (K6) has been removed from solenoid key release unit 974. With respect to second static transfer switch 981, this step may comprise automatically detecting that the copy of the fifth key (K6) has been removed from solenoid key release unit 998.

At step 1510, in response to at least detecting that the first key has been removed from the first solenoid key release unit, the switching logic of the static transfer switch is disabled. For example, with respect to static transfer switch 406, this step may comprise disabling switching logic 450 of static transfer switch 406 in response to detecting that the third key (K6) has been removed from solenoid key release unit 474. With respect to first static transfer switch 906, this step may comprise disabling switching logic 950 of first static transfer switch 906 in response to detecting that the copy of the fifth key (K6) has been removed from solenoid key release unit 974. With respect to second static transfer switch 981, this step may comprise disabling switching logic 982 of second static transfer switch 981 in response to detecting that the copy of the fifth key (K6) has been removed from solenoid key release unit 998.

Figure 16:
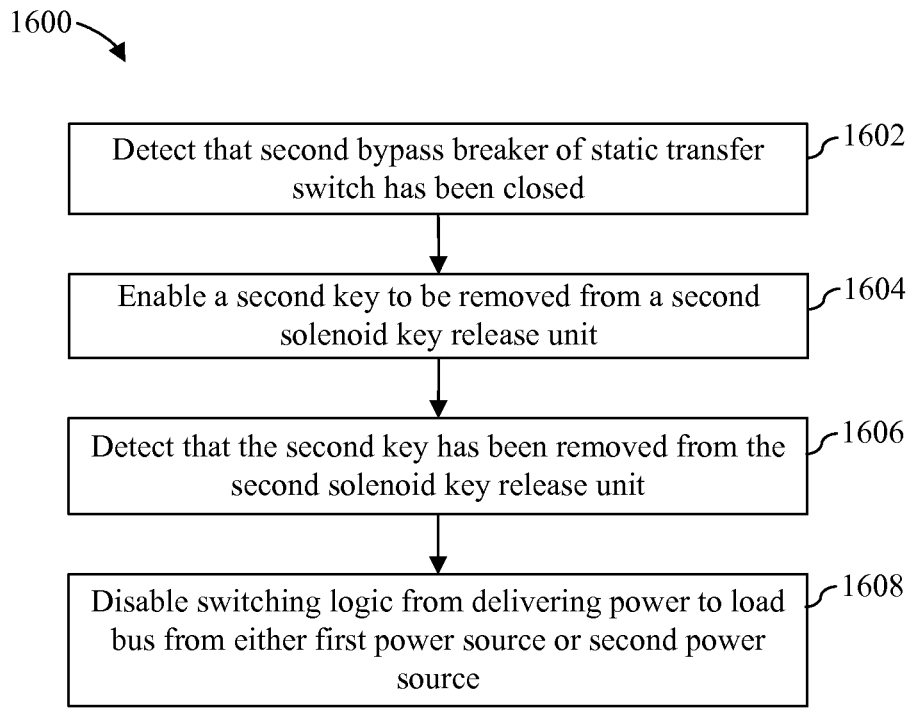
FIG. 16 depicts a flowchart of a method for automatically disabling switching logic of a static transfer switch having two bypass breakers in accordance with an embodiment.

FIG. 16 depicts a flowchart 1600 of a generalized method for automatically disabling switching logic of a static transfer switch having two bypass breakers in accordance with an embodiment. The method of flowchart 1600 may be implemented, for example, by one or more of first static transfer switch 906 and second static transfer switch 981 of electric power distribution system 900.

As shown in FIG. 16, the method of flowchart 1600 begins at step 1602 in which it is automatically detected that a second bypass breaker of the static transfer switch has been closed. For example, with respect to first static transfer switch 906, this step may comprise detecting that second bypass breaker 962 has been closed. With respect to second static transfer switch 981, this step may comprise detecting that second bypass breaker 994 has been closed.

At step 1604, in response to at least detecting that the second bypass breaker of the static transfer switch has been closed, a second key is enabled to be removed from a second solenoid key release unit. For example, with respect to first static transfer switch 906, this step may comprise enabling the copy of the sixth key (K7) to be removed from solenoid key release unit 976 in response to at least detecting that second bypass breaker 962 has been closed. With respect to second static transfer switch 981, this step may comprise enabling the copy of the sixth key (K7) to be removed from solenoid key release unit 999 in response to at least detecting that second bypass breaker 994 has been closed.

At step 1606, it is automatically detected that a second key has been removed from the second solenoid key release unit. For example, with respect to first static transfer switch 906, this step may comprise automatically detecting that the copy of the sixth key (K7) has been removed from solenoid key release unit 976. With respect to second static transfer switch 981, this step may comprise automatically detecting that the copy of the sixth key (K7) has been removed from solenoid key release unit 999.

At step 1610, in response to at least detecting that the second key has been removed from the second solenoid key release unit, the switching logic of the static transfer switch is disabled. For example, with respect to first static transfer switch 906, this step may comprise disabling switching logic 950 of first static transfer switch 906 in response to detecting that the copy of the sixth key (K7) has been removed from solenoid key release unit 976. With respect to second static transfer switch 981, this step may comprise disabling switching logic 982 of second static transfer switch 981 in response to detecting that the copy of the sixth key (K7) has been removed from solenoid key release unit 999.

IV. Additional Exemplary Embodiments

A key interlock system is described herein that includes a static transfer switch. The static transfer switch includes switching logic, a first bypass breaker, a first key interlock device, and a first solenoid key release unit. The switching logic is operable to selectively deliver power from one of a first power source or a second power source to a first load bus. The first bypass breaker is operable to be placed in either a closed state in which power can be delivered from the first power source to the first load bus via a path there between that bypasses the switching logic or in an open state in which power cannot be delivered from the first power source to the first load bus via the path there between that bypasses the switching logic. The first key interlock device is operable to be transitioned from a first state to a second state using a first key, the first state of the first key interlock device comprising a state in which the first key interlock device impedes closing of the first bypass breaker and prevents removal of a second key from the first key interlock device and the second state of the first key interlock device comprising a state in which the first key interlock device does not impede the closing of the first bypass breaker and enables removal of the second key from the first key interlock device. The first solenoid key release unit is operable to be placed in a non-energized state when the first bypass breaker is in the open state and to be placed in an energized state when at least the first bypass breaker is in the closed state. The first solenoid key release unit is further operable to prevent removal of a third key therefrom when in the non-energized state and to enable removal of the third key therefrom when in the energized state. The second key and the third key are required to obtain a fourth key that is useable to transition a bus tie breaker that is connected between the first load bus and a second load bus from an open state to a closed state.

In one embodiment of the foregoing key interlock system, the first solenoid key release unit is operable to be placed in the energized state when the first bypass breaker is in the closed state and a push button is pressed.

In another embodiment, the foregoing key interlock system further includes an auxiliary contact that is connected between a third power source and the first solenoid key release unit, the auxiliary contact being linked to the first bypass breaker and being operable to deliver power from the third power source to the first solenoid key release unit when at least the first bypass breaker is placed in the closed state. The third power source may comprise an uninterruptible power source. The auxiliary contact may be further connected between the third power source and a pilot light, the auxiliary contact being operable to deliver power from the third power source to the pilot light when the first bypass breaker is placed in the closed state.

In yet another embodiment of the foregoing key interlock system, the first key interlock device comprises a first lock cylinder and a second lock cylinder. The first lock cylinder is configured to receive the first key and is rotatable thereby to transition the first key interlock device from the first state to the second state. The second lock cylinder is configured to receive the second key and is rotatable thereby to transition the first key interlock device from the second state to the first state. The first state of the first key interlock device further comprises a state in which the first key interlock device enables removal of the first key from the first key interlock device and the second state of the first key interlock device further comprises a state in which the first key interlock device prevents removal of the first key from the first key interlock device.

In further accordance with this embodiment, the static transfer switch further comprises a second bypass breaker and a second key interlock device. The second bypass breaker is operable to be placed in either a closed state in which power can be delivered from the second power source to the first load bus via a path there between that bypasses the switching logic or an open state in which power cannot be delivered from the second power source to the first load bus via the path there between that bypasses the switching logic. The second key interlock device comprises a lock cylinder that is configured to receive the first key and is rotatable thereby to transition the second key interlock device between a first state and a second state, the first state of the second key interlock device comprising a state in which the second key interlock device impedes closing of the second bypass breaker and in which the second key interlock device enables removal of the first key from the second key interlock device and the second state of the second key interlock device comprising a state in which the second key interlock device does not impede the closing of the second bypass breaker and in which the second key interlock device prevents removal of the first key from the second key interlock device.

In still another embodiment, the foregoing key interlock system further includes a key transfer block that is operable to be transitioned from a first state to a second state using both the second key and the third key, the first state of the key transfer block comprising a state in which the key transfer block prevents removal of the fourth key from the key transfer block and the second state of the key transfer block comprising a state in which the key transfer block enables removal of fourth key from the key transfer block.

In a further embodiment of the foregoing key interlock system, the bus tie breaker comprises one of two bus tie breakers that are connected in series between the first load bus and the second load bus.

In a still further embodiment of the foregoing key interlock system, the static transfer switch is operable to disable the switching logic from delivering power to the first load bus from either the first power source or the second power source in response to detecting that the third key has been removed from the first solenoid key release unit.

Another key interlock system is described herein that includes a first static transfer switch, a second static transfer switch, a first key transfer block and a second key transfer block.

The first static transfer switch comprises first switching logic, a first bypass breaker, a first solenoid key release unit, a second bypass breaker, and a second solenoid key release unit. The first switching logic is operable to selectively deliver power from either a first power source or a second power source to a first load bus. The first bypass breaker, when closed, enables power to be delivered from the first power source to the first load bus via a first bypass path that bypasses the first switching logic. The first solenoid key release unit releases a first key when at least the first bypass breaker is closed. The second bypass breaker, when closed, enables power to be delivered from the second power source to the first load bus via a second bypass path that bypasses the first switching logic.

The second solenoid key release unit releases a second key when at least the second bypass breaker is closed. The second static transfer switch comprises second switching logic, a third bypass breaker, a third solenoid key release unit, a fourth bypass breaker, and a fourth solenoid key release unit. The second switching logic is operable to selectively deliver power from either the first power source or the second power source to a second load bus. The third bypass breaker, when closed, enables power to be delivered from the first power source to the second load bus via a third bypass path that bypasses the second switching logic. The third solenoid key release unit releases a third key when at least the third bypass breaker is closed. The fourth bypass breaker, when closed, enables power to be delivered from the second power source to the second load bus via a fourth bypass path that bypasses the second switching logic. The fourth solenoid key release unit releases a fourth key when at least the fourth bypass breaker is closed.

The first key transfer block is operable to release a fifth key that is useable to close a bus tie breaker that is connected between the first load bus and the second load bus in response to at least insertion of the first key and the third key.

The second key transfer block is operable to release a sixth key that is useable to close the bus tie breaker that is connected between the first load bus and the second load bus in response to at least insertion of the second key and the fourth key.

In one embodiment of the foregoing key interlock system, the first transfer switch further comprises a first key interlock device and a second key interlock device. The first key interlock device, when activated with a seventh key, enables the first bypass breaker to be closed and releases an eighth key. The second key interlock device, when activated with the seventh key, enables the second bypass breaker to be closed and releases a ninth key. In further accordance with this embodiment, the second transfer switch further comprises a third key interlock device and a fourth key interlock device. The third key interlock device, when activated with a tenth key, enables the third bypass breaker to be closed and releases an eleventh key. The fourth key interlock device, when activated with the tenth key, enables the fourth bypass breaker to be closed and releases a twelfth key. In still further accordance with this embodiment, the first transfer block is operable to release the fifth key in response to at least insertion of the first key, the third key, the eighth key and the eleventh key and the second transfer block is operable to release the sixth key in response to at least insertion of the second key, the fourth key, the ninth key and the twelfth key.

In another embodiment of the foregoing key interlock system, the first solenoid key release unit releases the first key when the first bypass breaker is closed and a first push button is pressed, the second solenoid key release unit releases the second key when the second bypass breaker is closed and a second push button is pressed, the third solenoid key release unit releases the third key when the third bypass breaker is closed and a third push button is pressed, and the fourth solenoid key release unit releases the fourth key when the fourth bypass breaker is closed and a fourth push button is pressed.

In further accordance with this embodiment, the first static switch comprises a first pilot light that is lit when the first bypass breaker is closed and a second pilot light that is lit when the second bypass breaker is closed, and the second static switch comprises a third pilot light that is lit when the third bypass breaker is closed and a fourth pilot light that is lit when the fourth bypass breaker is closed.

In yet another embodiment of the foregoing key interlock system, each of the first solenoid key release unit, the second solenoid key release unit, the third solenoid key release unit, and the fourth solenoid key release unit is powered by a power source other than the first power source or the second power source.

In still another embodiment of the foregoing key interlock system, at least one of the first solenoid key release unit, the second solenoid key release unit, the third solenoid key release unit, and the fourth solenoid key release unit is powered by an uninterruptible power source.

In a further embodiment of the foregoing key interlock system, the bus tie breaker comprises one of two bus tie breakers that are connected between the first load bus and the second load bus.

In a still further embodiment of the foregoing key interlock system, the first static transfer switch is operable to disable the first switching logic from delivering power to the first load bus from either the first power source or the second power source in response to determining that the first key has been removed from the first solenoid key release unit or that the second key has been removed from the second solenoid key release unit, and the second static transfer switch is operable to disable the second switching logic from delivering power to the second load bus from either the first power source or the second power source in response to determining that the third key has been removed from the third solenoid key release unit or that the fourth key has been removed from the fourth solenoid key release unit.

A method for implementing a static transfer switch that includes switching logic that is operable to selectively deliver power from either a first power source or a second power source to a load bus is described herein. The method includes: detecting that a first bypass breaker of the static transfer switch has been closed, the closing of the first bypass breaker enabling power to be delivered from the first power source to the load bus via a path there between that bypasses the switching logic; in response to at least detecting that the first bypass breaker has been closed, enabling a first key to be removed from a first solenoid key release unit; detecting that the first key has been removed from the first solenoid key release unit; and in response to at least detecting that the first key has been removed from the first solenoid key release unit, disabling the switching logic from delivering power to the load bus from either the first power source or the second power source.

The foregoing method may further include detecting that a second bypass breaker of the static transfer switch has been closed, the closing of the second bypass breaker enabling power to be delivered from the second power source to the load bus via a path there between that bypasses the switching logic; in response to at least detecting that the second bypass breaker has been closed, enabling a second key to be removed from a second solenoid key release unit; detecting that the second key has been removed from the second solenoid key release unit; and in response to at least detecting that the second key has been removed from the second solenoid key release unit, disabling the switching logic from delivering power to the load bus from either the first power source or the second power source.

V. CONCLUSION

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A key interlock system, comprising:
a static transfer switch that includes:
switching logic operable to selectively deliver power from one of a first power source or a second power source to a first load bus;
a first bypass breaker operable to be placed in either a closed state in which power can be delivered from the first power source to the first load bus via a path there between that bypasses the switching logic or in an open state in which power cannot be delivered from the first power source to the first load bus via the path there between that bypasses the switching logic;
a first key interlock device operable to be transitioned from a first state to a second state using a first key, the first state of the first key interlock device comprising a state in which the first key interlock device impedes closing of the first bypass breaker and prevents removal of a second key from the first key interlock device and the second state of the first key interlock device comprising a state in which the first key interlock device does not impede the closing of the first bypass breaker and enables removal of the second key from the first key interlock device; and
a first solenoid key release unit operable to be placed in a non-energized state when the first bypass breaker is in the open state and to be placed in an energized state when at least the first bypass breaker is in the closed state, the first solenoid key release unit being further operable to prevent removal of a third key therefrom when in the non-energized state and to enable removal of the third key therefrom when in the energized state;
the second key and the third key being required to obtain a fourth key that is useable to transition a bus tie breaker that is connected between the first load bus and a second load bus from an open state to a closed state.

2. The key interlock system of claim 1, wherein the first solenoid key release unit is operable to be placed in the energized state when the first bypass breaker is in the closed state and a push button is pressed.

3. The key interlock system of claim 2, further comprising an auxiliary contact that is connected between a third power source and the first solenoid key release unit, the auxiliary contact being linked to the first bypass breaker and being operable to deliver power from the third power source to the first solenoid key release unit when at least the first bypass breaker is placed in the closed state.

4. The key interlock system of claim 3, wherein the third power source comprises an uninterruptible power source.

5. The key interlock system of claim 3, wherein the auxiliary contact is further connected between the third power source and a pilot light, the auxiliary contact being operable to deliver power from the third power source to the pilot light when the first bypass breaker is placed in the closed state.

6. The key interlock system of claim 1, wherein the first key interlock device comprises:
a first lock cylinder that is configured to receive the first key and is rotatable thereby to transition the first key interlock device from the first state to the second state; and
a second lock cylinder that is configured to receive the second key and is rotatable thereby to transition the first key interlock device from the second state to the first state;
wherein the first state of the first key interlock device further comprises a state in which the first key interlock device enables removal of the first key from the first key interlock device and the second state of the first key interlock device further comprises a state in which the first key interlock device prevents removal of the first key from the first key interlock device.

7. The key interlock system of claim 6, wherein the static transfer switch further comprises:
a second bypass breaker that is operable to be placed in either a closed state in which power can be delivered from the second power source to the first load bus via a path there between that bypasses the switching logic or an open state in which power cannot be delivered from the second power source to the first load bus via the path there between that bypasses the switching logic; and
a second key interlock device that comprises:
a lock cylinder that is configured to receive the first key and is rotatable thereby to transition the second key interlock device between a first state and a second state, the first state of the second key interlock device comprising a state in which the second key interlock device impedes closing of the second bypass breaker and in which the second key interlock device enables removal of the first key from the second key interlock device and the second state of the second key interlock device comprising a state in which the second key interlock device does not impede the closing of the second bypass breaker and in which the second key interlock device prevents removal of the first key from the second key interlock device.

8. The key interlock system of claim 1, further comprising:
a key transfer block that is operable to be transitioned from a first state to a second state using both the second key and the third key, the first state of the key transfer block comprising a state in which the key transfer block prevents removal of the fourth key from the key transfer block and the second state of the key transfer block comprising a state in which the key transfer block enables removal of fourth key from the key transfer block.

9. The key interlock system of claim 1, wherein the bus tie breaker comprises one of two bus tie breakers that are connected in series between the first load bus and the second load bus.

10. The key interlock system of claim 1, wherein the static transfer switch is operable to disable the switching logic from delivering power to the first load bus from either the first power source or the second power source in response to detecting that the third key has been removed from the first solenoid key release unit.

11. A key interlock system, comprising:
a first static transfer switch that comprises:
first switching logic operable to selectively deliver power from either a first power source or a second power source to a first load bus;
a first bypass breaker that when closed enables power to be delivered from the first power source to the first load bus via a first bypass path that bypasses the first switching logic;
a first solenoid key release unit that releases a first key when at least the first bypass breaker is closed;
a second bypass breaker that when closed enables power to be delivered from the second power source to the first load bus via a second bypass path that bypasses the first switching logic; and
a second solenoid key release unit that releases a second key when at least the second bypass breaker is closed;
a second static transfer switch that comprises:
second switching logic operable to selectively deliver power from either the first power source or the second power source to a second load bus;
a third bypass breaker that when closed enables power to be delivered from the first power source to the second load bus via a third bypass path that bypasses the second switching logic;
a third solenoid key release unit that releases a third key when at least the third bypass breaker is closed;
a fourth bypass breaker that when closed enables power to be delivered from the second power source to the second load bus via a fourth bypass path that bypasses the second switching logic; and
a fourth solenoid key release unit that releases a fourth key when at least the fourth bypass breaker is closed;
a first key transfer block that is operable to release a fifth key that is useable to close a bus tie breaker that is connected between the first load bus and the second load bus in response to at least insertion of the first key and the third key; and
a second key transfer block that is operable to release a sixth key that is useable to close the bus tie breaker that is connected between the first load bus and the second load bus in response to at least insertion of the second key and the fourth key.

12. The key interlock system of claim 11,
wherein the first transfer switch further comprises:
a first key interlock device that when activated with a seventh key enables the first bypass breaker to be closed and releases an eighth key; and
a second key interlock device that when activated with the seventh key enables the second bypass breaker to be closed and releases a ninth key;
wherein the second transfer switch further comprises:
a third key interlock device that when activated with a tenth key enables the third bypass breaker to be closed and releases an eleventh key; and
a fourth key interlock device that when activated with the tenth key enables the fourth bypass breaker to be closed and releases a twelfth key;
wherein the first transfer block is operable to release the fifth key in response to at least insertion of the first key, the third key, the eighth key and the eleventh key; and
wherein the second transfer block is operable to release the sixth key in response to at least insertion of the second key, the fourth key, the ninth key and the twelfth key.

13. The key interlock system of claim 11, wherein:
the first solenoid key release unit releases the first key when the first bypass breaker is closed and a first push button is pressed;
the second solenoid key release unit releases the second key when the second bypass breaker is closed and a second push button is pressed;
the third solenoid key release unit releases the third key when the third bypass breaker is closed and a third push button is pressed; and
the fourth solenoid key release unit releases the fourth key when the fourth bypass breaker is closed and a fourth push button is pressed.

14. The key interlock system of claim 13, wherein:
the first static switch comprises a first pilot light that is lit when the first bypass breaker is closed and a second pilot light that is lit when the second bypass breaker is closed; and
the second static switch comprises a third pilot light that is lit when the third bypass breaker is closed and a fourth pilot light that is lit when the fourth bypass breaker is closed.

15. The key interlock system of claim 11, wherein each of the first solenoid key release unit, the second solenoid key release unit, the third solenoid key release unit, and the fourth solenoid key release unit is powered by a power source other than the first power source or the second power source.

16. The key interlock system of claim 15, wherein at least one of the first solenoid key release unit, the second solenoid key release unit, the third solenoid key release unit, and the fourth solenoid key release unit is powered by an uninterruptible power source.

17. The key interlock system of claim 16, wherein the bus tie breaker comprises one of two bus tie breakers that are connected between the first load bus and the second load bus.

18. The key interlock system of claim 11, wherein:
the first static transfer switch is operable to disable the first switching logic from delivering power to the first load bus from either the first power source or the second power source in response to determining that the first key has been removed from the first solenoid key release unit or that the second key has been removed from the second solenoid key release unit; and
the second static transfer switch is operable to disable the second switching logic from delivering power to the second load bus from either the first power source or the second power source in response to determining that the third key has been removed from the third solenoid key release unit or that the fourth key has been removed from the fourth solenoid key release unit.

19. A method for implementing a static transfer switch that includes switching logic that is operable to selectively deliver power from either a first power source or a second power source to a load bus, comprising:
- detecting that a first bypass breaker of the static transfer switch has been closed, the closing of the first bypass breaker enabling power to be delivered from the first power source to the load bus via a path there between that bypasses the switching logic;
- in response to at least detecting that the first bypass breaker has been closed, enabling a first key to be removed from a first solenoid key release unit;
- detecting that the first key has been removed from the first solenoid key release unit; and
- in response to at least detecting that the first key has been removed from the first solenoid key release unit, disabling the switching logic from delivering power to the load bus from either the first power source or the second power source.

20. The method of claim 19, further comprising:
- detecting that a second bypass breaker of the static transfer switch has been closed, the closing of the second bypass breaker enabling power to be delivered from the second power source to the load bus via a path there between that bypasses the switching logic;
- in response to at least detecting that the second bypass breaker has been closed, enabling a second key to be removed from a second solenoid key release unit;
- detecting that the second key has been removed from the second solenoid key release unit; and
- in response to at least detecting that the second key has been removed from the second solenoid key release unit, disabling the switching logic from delivering power to the load bus from either the first power source or the second power source.

* * * * *